(12) United States Patent
Nyangon et al.

(10) Patent No.: US 12,190,219 B1
(45) Date of Patent: Jan. 7, 2025

(54) SYSTEMS AND METHODS FOR OUTLIER DETECTION AND FEATURE TRANSFORMATION IN MACHINE LEARNING MODEL TRAINING

(71) Applicant: SAS INSTITUTE INC., Cary, NC (US)

(72) Inventors: Joseph O. Nyangon, Hummelstown, PA (US); Ruth Oluwadamilola Akintunde, Wake Forest, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/824,828

(22) Filed: Sep. 4, 2024

Related U.S. Application Data

(60) Provisional application No. 63/600,505, filed on Nov. 17, 2023, provisional application No. 63/537,477, filed on Sep. 8, 2023.

(51) Int. Cl.
*G06N 20/00* (2019.01)

(52) U.S. Cl.
CPC .................... *G06N 20/00* (2019.01)

(58) Field of Classification Search
CPC ..................................................... G06N 20/00
See application file for complete search history.

(56) References Cited

U.S. PATENT DOCUMENTS

| | | | | |
|---|---|---|---|---|
| 2015/0236971 A1* | 8/2015 | Sesha | ............. | H04L 47/70 709/226 |
| 2018/0330250 A1* | 11/2018 | Nakayama | ......... | G06Q 10/0635 |
| 2020/0097351 A1* | 3/2020 | Raghavan | ............. | G06F 16/353 |

OTHER PUBLICATIONS

Rastogi et al., "Evaluating the suitability of regression-based emulators of building performance in practice: A test suite," Journal of Building Performance Simulation, 15(4), 2021, pp. 488-506.
Liu et al., "Overfitting in linear feature extraction for classification of high-dimensional image data.," Pattern Recogn. 53, C, May 2016, pp. 73-86.
Rinaldi et al., "Wind and Solar Resource Droughts in California Highlight the Benefits of Long-Term Storage and Integration with the Western Interconnect," Environmental Science & Technology, 55(9), 2021, pp. 6214-6226.
Sadeghi-Mobarakeh et al., "Data mining based on random forest model to predict the California ISO day-ahead market prices," 2017 IEEE Power & Energy Society Innovative Smart Grid Technologies Conference (ISGT), 2017, pp. 1-5.
Salis et al., "Robust Principal Component Analysis: Two Analyses in One," 2018, pp. 1-11.
SAS Institute, "SAS® 9.4 and SAS® Viya® 3.4 Programming Documentation," The SAS RPCA Procedure, 2023, pp. 1-589.
Seel et al., "Plentiful electricity turns wholesale prices negative," Advances in Applied Energy, 4, 2021, pp. 1-4.

(Continued)

*Primary Examiner* — Dave Misir
(74) *Attorney, Agent, or Firm* — Padowithz Alce; Alce PLLC

(57) ABSTRACT

A computer-program product, computer-implemented method, and computer-implemented system includes obtaining a raw dataset; executing an outlier filtration process based on obtaining the raw dataset; training a model using a refined outlier-reduced dataset; and predicting, via the trained model, a value of the target entity at a future time.

29 Claims, 24 Drawing Sheets

(56) References Cited

OTHER PUBLICATIONS

Shaker et al., "Impacts of large-scale wind and solar power integration on California's net electrical load," Renewable and Sustainable Energy Reviews, 58, 2016, pp. 761-774.
Shomali et al., "The consequences of smart grids for the business model of electricity firms," Journal of Cleaner Production, 112, Part 5, pp. 3830-3841.
Spiliotis et al., "Chapter 4—Forecasting weekahead hourly electricity prices in Belgium with statistical and machine learning methods.," In A. Dagoumas (Ed.), Mathematical Modelling of Contemporary Electricity Markets, 2021, pp. 59-74.
Sreedharan et al., "Microgrid and renewable generation integration: University of California, San Diego," Applied Energy, 169, 2016, pp. 709-720.
Talaat et al., Renewable power integration: Experimental and simulation study to investigate the ability of integrating wave, solar and wind energies. Energy, 170, 2019, pp. 668-682.
Tan et al., "Optimal distributed renewable generation planning: A review of different approaches," Renewable and Sustainable Energy Reviews, 18, 2013, pp. 626-645.
Uniejewski et al., "Understanding intraday electricity markets: Variable selection and very short-term price forecasting using LASSO," International Journal of Forecasting, 35(4), 2019, pp. 1533-1547.
Van Triel et al., "Modeling the Future California Electricity Grid and Renewable Energy Integration with Electric Vehicles," Energies, 13(20), Article 20, 2020, pp. 1-21.
Vinutha et al., Detection of Outliers Using Interquartile Range Technique from Intrusion Dataset. In S. C Satapathy, J. M. R. S. Tavares, V. Bhateja, & J. R. Mohanty (Eds.), Information and Decision Sciences, 2018, pp. 511-518.
Vishnupriyan et al., "Multi-criteria decision analysis for renewable energy integration: A southern India focus," Renewable Energy, 121, 2018, pp. 474-488.
Vivas et al., "A Systematic Review of Statistical and Machine Learning Methods for Electrical Power Forecasting with Reported MAPE Score," Entropy, 22(12), Article 12, 2020, pp. 1-25.
Vosin et al., "Impact of climate change on water availability and its propagation through the Western U.S. power grid," Applied Energy, 276, 2020, pp. 1-10.
Wang et al., "Economic footprint of California wildfires in 2018," Nature Sustainability, 4(3), Article 3, 2021, pp. 1-21.
Wang et al., "Robust Big Data Analytics for Electricity Price Forecasting in the Smart Grid," IEEE Transactions on Big Data, 5(1), 2019, pp. 34-45.
Weron et al., "Forecasting spot electricity prices: A comparison of parametric and semiparametric time series models," International Journal of Forecasting, 24(4), 2008, pp. 744-763.
Wong-Parodi et al., "When climate change adaptation becomes a "looming threat" to society: Exploring views and responses to California wildfires and public safety power shutoffs," Energy Research & Social Science, 70, 2020, pp. 1-7.
Woo et al., Electricity price behavior and carbon trading: New evidence from California. Applied Energy, 204,2017, pp. 531-543.
Woo et al., "Merit-order effects of renewable energy and price divergence in California's day-ahead and real-time electricity markets," Energy Policy, 92, 2016, pp. 299-312.
Wu et al., "Forecast of Short-Term Electricity Price Based on Data Analysis," Mathematical Problems in Engineering, 2021, e6637183, pp. 1-14.
Yang et al., Electricity price forecasting by a hybrid model, combining wavelet transform, ARMA and kernel-based extreme learning machine methods. Applied Energy, 190, 2017, pp. 291-305.
Yuan et al., Investment risk assessment of coal-fired power plants in countries along the Belt and Road initiative based on ANP-Entropy-TODIM method. Energy, 176, 2019, pp. 623-640.
Zhang et al., "Wavelet transform and Kernel-based extreme learning machine for electricity price forecasting," Energy Systems, 9(1), 2018, pp. 113-134.
Zhao et al., "Robust Principal Component Analysis with Complex Noise," International Conference on Machine Learning, 2014, pp. 1-9.
Zhao et al., "Survey of U.S. Ancillary Services Markets (ANL/ESD-6/1)," Argonne National Lab, 2016, pp. 1-3.
Abido et al., "Seasonal challenges for a California renewable—energy-driven grid," iScience, 25(1), 2022, pp. 1-18.
Abiodun et al., "The value of concentrating solar power in ancillary services markets," Applied Energy, 334, 120518, 2023, pp. 1-7.
Acemoglu et al., "Competition in Electricity Markets with Renewable Energy Sources," The Energy Journal, 38 (SI1), pp. 137-155.
Ilin et al., "Practical Approaches to Principal Component Analysis in the Presence of Missing Values," J. Mach. Learn. Res. 11 (Mar. 1, 2010), pp. 1957-2000.
Alhassan et al., "Assimilation of Principal Component Analysis and Wavelet with Kernel Support Vector Regression for Medium-Term Financial Time Series Forecasting," International Journal of Management and Humanities, 4(7), 2020, pp. 40-48.
Ali et al., "State-of-the-Art Artificial Intelligence Techniques for Distributed Smart Grids,"A Review. Electronics, 9(6), Article 6, 2020, pp. 1-26.
Bose et al., "Artificial Intelligence Techniques in Smart Grid and Renewable Energy Systems Some Example Applications," Proceedings of the IEEE, 105(11), 2017, pp. 2262-2273.
Byrne et al., "American policy conflict in the hothouse: Exploring the politics of climate inaction and polycentric rebellion," Energy Research & Social Science, 89, 2022, 102551.
Byrne et al., "A review of the solar city concept and methods to assess rooftop solar electric potential, with an illustrative application to the city of Seoul," Renewable and Sustainable Energy Reviews, 2015, 41, pp. 830-844.
Byrne et al., "Opportunities for Energy Storage in CAISO: Day-Ahead and Real-Time Market Arbitrage," 2018 International Symposium on Power Electronics, Electrical Drives, Automation and Motion (SPEEDAM), pp. 63-68.
Chen et al., "Electricity Price Forecasting With Extreme Learning Machine and Bootstrapping," IEEE Transactions on Power Systems, 27(4), pp. 2055-2062.
Dai et al., "A real-time pricing scheme considering load uncertainty and price competition in smart grid market," Journal of Industrial and Management Optimization, 2020, 16(2), pp. 777-793.
Daneshi et al., "Overview of Renewable Energy Portfolio in CAISO—Operational and Market Challenges," 2018 IEEE Power & Energy Society General Meeting (PESGM), 2018, pp. 1-5.
Q. Duan, "A price-based demand response scheduling model in day-ahead electricity market," 2016 IEEE Power and Energy Society General Meeting (PESGM), 2016, pp. 1-5.
Ehnberg et al., "Categorisation of Ancillary Services for Providers," Latvian Journal of Physics and Technical Sciences, 56(1), 2019, pp. 3-20.
Emmanuel et al., "A review of power system planning and operational models for flexibility assessment in high solar energy penetration scenarios," Solar Energy, 210, 2020, pp. 169-180.
Q. Fan, "Asymmetric multiscale detrended fluctuation analysis of California electricity spot price," Physica A: Statistical Mechanics and Its Applications, 2016, 442, pp. 252-260.
Filho et al., Understanding the Drivers of Negative Electricity Price Using Decision Tree. 2017 Ninth Annual IEEE Green Technologies Conference (GreenTech), 2017, pp. 151-156.
Forootan et al., "Machine Learning and Deep Learning in Energy Systems: A Review," Sustainability, 14(8), Article 8, 2022, pp. 1-50.
P. Fox-Penner et al., Power After Carbon: Building a Clean, Resilient Grid (p. 93). Harvard University Press, pp. 1-3.
Ginsberg et al., "Grid Flexibility and the Cost of Integrating Variable Renewable Energy: Toward a Renewable Energy Integration Adder for San Diego Gas and Electric Service Territory and the California Electric Grid," 2018 IEEE 7th World Conference on Photovoltaic Energy Conversion (WCPEC) (A Joint Conference of 45th IEEE PVSC, 28th PVSEC & 34th EU PVSEC), 2018, pp. 1402-1405.
Hay et al., "The impact of wildfires and beneficial electrification on electricity rates in PG&E's service territory," The Electricity Journal, 33(3), 2020, 106710, pp. 1-3.

(56) References Cited

OTHER PUBLICATIONS

He et al., Electricity price forecasting with a BED (Bivariate EMD Denoising) methodology. Energy, 91, 2015, pp. 601-609.

Hodge et al., "A Survey of Outlier Detection Methodologies," Artificial Intelligence Review 22, 85-126 (2004), pp. 1-9.

Hodge et al., "Day-Ahead Electricity Price Forecasting Using a Hybrid Principal Component Analysis Network," Energies, 5(11), Article 11, 2012, pp. 1-16.

Hopwood et al., "An assessment of the value of principal component analysis for photovoltaic IV trace classification of physically-induced failures," 2020 47th IEEE Photovoltaic Specialists Conference (PVSC), 2020, pp. 0798-0802.

Hou et al., "Probabilistic duck curve in high PV penetration power system: Concept, modeling, and empirical analysis in China," Applied Energy, 242, 2019, pp. 205-215.

Ji et al., "Resilience of Energy Infrastructure and Services: Modeling, Data Analytics, and Metrics.," Proceedings of the IEEE, 105(7), 2017, pp. 1354-1366.

C.S. Jones, "Extracting factors from heteroskedastic asset returns," Journal of Financial Economics, 62(2), 2001, pp. 293-325.

K. Jones et al., "Coordinating markets for reliability: Resource adequacy as a public good," The Electricity Journal, 35(3), 107097, 2022, pp. 1-2.

Kahrobaee et al., "PV Curtailment Analysis to Improve Utilization of Hosting Capacity in California," 2019 IEEE 46th Photovoltaic Specialists Conference (PVSC), 2019, pp. 2060-2063.

Lago et al., "Forecasting spot electricity prices: Deep learning approaches and empirical comparison of traditional algorithms," Applied Energy, 221, 2018, pp. 386-405.

Lago et al., "Forecasting day-ahead electricity prices: A review of state-of-the-art algorithms, best practices and an open-access benchmark," Applied Energy, 293, 116983, 2021, pp. 1-21.

Li et al., "Principal Component Analysis of Price Fluctuation in the Smart Grid Electricity Market," Sustainability, 10 (11), Article 11, 2018, pp. 1-17.

Liu et al., "Modeling of Spatial Distribution Characteristics of High Proportion Renewable Energy Based on Complex Principal Component Analysis," 2020 IEEE Sustainable Power and Energy Conference (ISPEC), 2020, pp. 193-198.

Lu et al., A Dynamic pricing demand response algorithm for smart grid: Reinforcement learning approach. Applied Energy, 220, 2018, pp. 220-230.

C. Malloy et al., The Consequences of Wildfire Liability for Firm Precaution: Evidence from Power Shutoffs in California, 2023, pp. 1-72.

E. Martinot et al., "Grid Integration of Renewable Energy: Flexibility, Innovation, and Experience," Annual Review of Environment and Resources, 41(1), 2016, pp. 223-251.

Meng et al., "Comparisons of Machine Learning Methods for Electricity Regional Reference Price Forecasting," In W. Yu, H. He, & N. Zhang (Eds.), Advances in Neural Networks—ISNN 2009, pp. 827-835.

Naderi et al., "Dynamic modeling, stability analysis and control of interconnected microgrids: A review," Applied Energy, 334, 120647, 2023, pp. 1-24.

Nikkhah et al., "Integration of principal component analysis and artificial neural networks to more effectively predict agricultural energy flows," Environmental Progress & Sustainable Energy, 38(4), 13130, 2019, pp. 1-16.

Nowotarski et al., "On the importance of the long-term seasonal component in dayahead electricity price forecasting," Energy Economics, 57, pp. 228-235.

J. Nyangon et al., "Smart Energy Frameworks for Smart Cities: The Need for Polycentrism," In J. C. Augusto (Ed.), Handbook of Smart Cities, vol. 1—Book, Section, 2021, pp. 1-32.

Nyangon et al., "Tackling the Risk of Stranded Electricity Assets with Machine Learning and Artificial Intelligence," In J. Nyangon & J. Byrne (Eds.), Sustainable Energy Investment: Technical, Market and Policy Innovations to Address Risk, vol. 1—Book, Section, pp. 1-22.

Nyangon et al., "Diversifying Electricity Customer Choice: REVing Up the New York Energy Vision for Polycentric Innovation," In P. V. Tsvetkov (Ed.), Energy Systems and Environment, vol. 1—Book, Section, 2018, pp. 3-23.

Nyangon et al., "Spatial Energy Efficiency Patterns in New York and Implications for Energy Demand and the Rebound Effect," Energy Sources, Part B: Economics, Planning, and Policy, 2021, pp. 1-5.

Nyangon et al., "Estimating the impacts of natural gas power generation growth on solar electricity development: PJM's evolving resource mix and ramping capability," WIREs Energy and Environment, 12(1), 2023, pp. 1-53.

Nyangon et al., An assessment of price convergence between natural gas and solar photovoltaic in the U.S electricity market, WIREs Energy and Environment, 6(3), 2017, pp. 1-15.

Pollitt et al., "Competition in Markets for Ancillary Services? The Implications of Rising Distributed Generation," The Energy Journal, 41(01), 2020, pp. 1-28.

J. Price, "California market designs for grid services to integrate renewable energy portfolios," 2016 IEEE Power and Energy Society General Meeting (PESGM), 2016, pp. 1-1.

* cited by examiner

| 1502A | 1502B | 1502C | 1502D | 1502E | 1502F | 1502G | 1502H | 1502I |
|---|---|---|---|---|---|---|---|---|
| Timestamp | YDay_Value | YDay_Load | YAve_Load | Month | DOW | DOM | DOY | Current Demand |
| 2016-01-01 00:00:00 | 20/MWh | 18,000 MW | 19,000 MW | 1 | 5 | 1 | 1 | 22/MWh |
| 2016-01-01 01:00:00 | 20/MWh | 18,500 MW | 19,000 MW | 1 | 5 | 1 | 1 | 23/MWh |
| ... | ... | ... | ... | ... | ... | ... | ... | ... |
| 2021-12-31 23:00:00 | 45/MWh | 26,000 MW | 25,500 MW | 12 | 5 | 31 | 365 | 47/MWh |

FIG. 15A

| Statistic | 2016 | 2017 | 2018 | 2019 | 2020 | 2021 |
|---|---|---|---|---|---|---|
| Count | 8760.00 | 8665.00 | 8736.00 | 8760.00 | 8784.00 | 8736.00 |
| Mean | 29.85 | 34.90 | 39.48 | 37.12 | 33.42 | 53.92 |
| Standard deviation | 10.77 | 27.39 | 32.13 | 22.86 | 34.82 | 37.99 |
| Minimum | 0.35 | -13.23 | -17.33 | -12.59 | -10.43 | -0.31 |
| 25% | 22.72 | 25.77 | 27.31 | 25.72 | 22.91 | 36.10 |
| 50% | 28.48 | 31.59 | 35.11 | 33.79 | 29.93 | 49.57 |
| 75% | 35.08 | 41.18 | 46.26 | 43.63 | 37.94 | 63.37 |
| Maximum | 103.29 | 806.26 | 946.36 | 259.31 | 997.37 | 961.04 |

| S/N | Method | Label | Training RMSE | Test RMSE | Training RSquared | Test RSquared |
|---|---|---|---|---|---|---|
| 1 | LR model using 7 raw features before outlier removal | Pre-outlier removal | 18.65 | 26.28 | 0.63 | 0.18 |
| 2 | LR model using 7 raw features after outlier removal by traditional method: (1.5*IQR) | 1.5*IQR w/ Raw | 6.19 | 6.69 | 0.84 | 0.82 |
| 3 | LR model using python PCA transformed features after outlier removal by traditional method: (1.5*IQR) | 1.5*IQR w/ Python PCA | 12.69 | 22.10 | 0.33 | -1.0 |
| 4 | LR model using SAS PCA transformed features after outlier removal by traditional method: (1.5*IQR) | 1.5*IQR w/ SAS PCA | 8.13 | 8.18 | 0.73 | 0.72 |
| 5 | LR model using SAS RPCA transformed features after outlier removal by traditional method: (1.5*IQR) | 1.5*IQR w/ SAS RPCA | 7.95 | 8.02 | 0.74 | 0.73 |
| 6 | LR model using 7 raw features after outlier removal by SAS Sparse Matrix method | SAS Sparse w/ Raw | 6.26 | 7.09 | 0.85 | 0.81 |
| 7 | LR model using Python PCA transformed features after outlier removal by SAS Sparse Matrix method | SAS Sparse w/ Python PCA | 6.50 | 19.62 | 0.84 | -0.46 |

FIG. 18D-1

| | | | | | |
|---|---|---|---|---|---|
| 8 | LR model using SAS PCA transformed features after outlier removal by SAS Sparse Matrix method | SAS Sparse w/ SAS PCA | 6.58 | 6.59 | 0.83 | 0.83 |
| 9 | LR model using SAS RPCA transformed features after outlier removal by SAS Sparse Matrix method | SAS Sparse w/ SAS RPCA | 7.28 | 7.30 | 0.80 | 0.80 |
| 10 | LR model using 7 raw features after outlier removal by traditional then SAS Sparse Matrix method | Combined w/ Raw | 5.72 | 5.87 | 0.85 | 0.84 |
| 11 | LR model using Python PCA transformed features after outlier removal by traditional then SAS Sparse Matrix method | Combined w/ Python PCA | 5.93 | 16.72 | 0.83 | -0.33 |
| 12 | LR model using SAS PCA transformed features after outlier removal by traditional then SAS Sparse Matrix method | Combined w/ SAS PCA | 5.98 | 5.83 | 0.83 | 0.84 |
| 13 | LR model using SAS RPCA transformed features after outlier removal by traditional then SAS Sparse Matrix method | Combined w/ SAS RPCA | 6.68 | 6.54 | 0.79 | 0.80 |

FIG. 18D-2

SYSTEMS AND METHODS FOR OUTLIER DETECTION AND FEATURE TRANSFORMATION IN MACHINE LEARNING MODEL TRAINING

CROSS-REFERENCE TO RELATED APPLICATIONS

This application claims the benefit of U.S. Provisional Application No. 63/600,505, filed on 17 Nov. 2023, and U.S. Provisional Application No. 63/537,477, filed on 8 Sep. 2023, which are incorporated in their entireties by this reference.

TECHNICAL FIELD

This invention relates generally to the machine learning field, and more specifically, to new and useful systems and methods for outlier detection and feature transformation in machine learning model training.

BACKGROUND

Previous approaches for processing large datasets containing historical values have typically involved basic outlier detection techniques that rely on statistical measures such as mean and standard deviation, and often struggle with complex or high-dimensional data. As a result, the effectiveness of outlier detection and subsequent data processing has been limited, leading to potential inaccuracies in predictive modeling and forecasting. In some cases, outlier detection algorithms using fixed threshold values may misidentify outliers in datasets with variable distributions, overlooking subtle anomalies or inaccurately flagging normal data points, thus yielding suboptimal results and reducing utility in evolving real-world applications. Furthermore, existing techniques for outlier detection and data processing often lack the capability to effectively separate outliers from the main dataset while preserving important features for predictive modeling.

Consequently, there remains a need in the art for more sophisticated outlier filtration processes that can robustly handle complex datasets and improve the quality of predictive modeling outcomes. The embodiments of the present application provide technical solutions that address, at least, the needs described above, as well as the deficiencies of the state of the art.

BRIEF SUMMARY OF THE INVENTION(S)

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

The disclosure describes at least the following unique aspects, among others:

In some aspects, the techniques described herein relate to a computer-program product including a non-transitory machine-readable storage medium storing computer instructions that, when executed by one or more processors, perform operations including: obtaining a raw dataset including a plurality of data samples that store historical values of a target entity; executing an outlier filtration process based on obtaining the raw dataset, wherein the outlier filtration process includes: detecting, by a quantile-based outlier filtration algorithm, outlier data samples of the plurality of data samples that exceed a lower quantile threshold or an upper quantile threshold, generating an intermediate outlier-reduced dataset that includes a subset of the plurality of data samples, wherein the intermediate outlier-reduced dataset excludes the outlier data samples that exceed the lower quantile threshold or the upper quantile threshold, decomposing, by a matrix decomposition algorithm, the intermediate outlier-reduced dataset into a transformed features matrix and a sparse matrix, wherein the transformed features matrix includes a plurality of feature vectors of a plurality of principal components of the intermediate outlier-reduced dataset; and generating a refined outlier-reduced dataset that includes a subset of the plurality of feature vectors, wherein the refined outlier-reduced dataset excludes feature vectors of the transformed features matrix that are associated with an anomalous value in the sparse matrix; training a model using the refined outlier-reduced dataset; and predicting, via the trained model, a value of the target entity at a future time.

In some aspects, the techniques described herein relate to a computer-program product, wherein: the sparse matrix includes a plurality of numerical entries, a respective feature vector of the transformed features matrix is associated with a respective numerical entry in the sparse matrix, a value of the respective numerical entry is anomalous when the value of the respective numerical entry corresponds to a non-zero value, and the value of the respective numerical entry is not anomalous when the value of the respective numerical entry corresponds to a zero value.

In some aspects, the techniques described herein relate to a computer-program product, wherein: a subset of the plurality of data samples in the raw dataset cause heteroskedasticity and skewness, the refined outlier-reduced dataset excludes the subset of the plurality of data samples that cause the heteroskedasticity and the skewness, and using the refined outlier-reduced dataset to train the model mitigates an impact that the heteroskedasticity and the skewness have on a weight and a bias of the model.

In some aspects, the techniques described herein relate to a computer-program product, wherein: the quantile-based outlier filtration algorithm detects that a first subset of the plurality of data samples exceed the lower quantile threshold and that a second subset of the plurality of data samples exceed the upper quantile threshold, and the intermediate outlier-reduced data set: excludes the outlier data samples that exceed the lower quantile threshold and the upper quantile threshold, including the first subset and the second subset of the plurality of data samples, and includes data samples of the plurality of data samples that are within the lower quantile threshold and the upper quantile threshold.

In some aspects, the techniques described herein relate to a computer-program product, wherein: the lower quantile threshold and the upper quantile threshold are computed for a first period of time within the raw dataset, the quantile-based outlier filtration algorithm further computes a lower quantile threshold and an upper quantile threshold for at least a second period of time within the raw dataset, and detecting, by the quantile-based outlier filtration algorithm, includes: detecting the outlier data samples of the plurality of data samples that exceed the lower quantile threshold and the upper quantile threshold of the first period of time, and detecting outlier data samples of the plurality of data samples that exceed the lower quantile threshold and the upper quantile threshold of the second period of time.

In some aspects, the techniques described herein relate to a computer-program product, wherein: the raw dataset includes a first number of dimensions, and the transformed features matrix represents features of the intermediate outlier-reduced dataset, a subset of the raw dataset, using a smaller number of dimensions than the first number of dimensions.

In some aspects, the techniques described herein relate to a computer-program product, wherein: the outlier filtration process includes a plurality of outlier filtration stages, including a first outlier filtration stage and a second outlier filtration stage, the first outlier filtration stage is executed before the second outlier filtration stage and includes: the detecting of the outlier data samples that exceed the lower quantile threshold or the upper quantile threshold, and the generating of the intermediate outlier-reduced dataset, and the second outlier filtration stage is executed after the first outlier filtration stage and includes: the decomposing of the intermediate outlier-reduced dataset, and the generating of the refined outlier-reduced dataset.

In some aspects, the techniques described herein relate to a computer-program product, wherein: the plurality of data samples store the historical values of the target entity via a demand value column, the lower quantile threshold is calculated as a first quartile of the demand value column minus a product between a pre-defined scaling factor and an interquartile range of the demand value column, and the upper quantile threshold is calculated as a third quartile of the demand value column plus the product between the pre-defined scaling factor and the interquartile range of the demand value column.

In some aspects, the techniques described herein relate to a computer-program product, wherein the interquartile range of the demand value column is defined as a difference between the third quartile of the demand value column and the first quartile of the demand value column.

In some aspects, the techniques described herein relate to a computer-program product, wherein: the target entity is an energy commodity, the plurality of data samples are time series data samples recorded at pre-defined intervals over a period of time, and a historical value stored within a respective data sample of the plurality of data samples specifies a historical demand of the energy commodity at a respective interval over the period of time.

In some aspects, the techniques described herein relate to a computer-program product, wherein a respective data sample of the plurality of data samples includes: a respective historical value of the target entity, and a plurality of features for predicting the respective historical value.

In some aspects, the techniques described herein relate to a computer-program product, wherein: the target entity is an energy commodity, and predicting the value of the target entity at the future time includes predicting a demand of the energy commodity at the future time.

In some aspects, the techniques described herein relate to a computer-program product, wherein predicting the value of the target entity at the future time includes: receiving, via the trained model, a model input that at least specifies features of the target entity during a period preceding the future time; and predicting, via the trained model, the value of the target entity at the future time based at least on the features of the target entity during the period preceding the future time.

In some aspects, the techniques described herein relate to a computer-program product, wherein: the future time is 24 hours ahead of a current time, and the period preceding the future time is the current time.

In some aspects, the techniques described herein relate to a computer-program product, wherein the features of the target entity during the period preceding the future time at least include: a demand of the target entity during the period preceding the future time, and a load of the target entity during the period preceding the future time.

In some aspects, the techniques described herein relate to a computer-program product, wherein: the features of the target entity during the period preceding the future time further include: an average load of the target entity during a day associated with the period preceding the future time, and the model input further specifies temporal features associated with the future time, including: a numerical representation of a month associated with the future time, a numerical representation of a day of week associated with the future time, a numerical representation of a day of month associated with the future time, and a numerical representation of a day of year associated with the future time.

In some aspects, the techniques described herein relate to a computer-program product, wherein: the matrix decomposition algorithm is a robust principal component analysis algorithm (RPCA), the robust principal component analysis algorithm (RPCA) solves an optimization formula to decompose the intermediate outlier-reduced dataset into the transformed features matrix and the sparse matrix, and an objective of the optimization formula is to minimize a nuclear norm $\|L\|*$ of the transformed features matrix and an l1 norm $\|S\|1$ of the sparse matrix, formulated as minimize $|L|+\lambda|S|1$, wherein: $\lambda$ is a regularization parameter that is computed as $1/\sqrt{n}$, and n is a number of observations in the intermediate outlier-reduced dataset.

In some aspects, the techniques described herein relate to a computer-implemented method including: obtaining a raw dataset including a plurality of data samples that store historical values of a target entity; executing an outlier filtration process based on obtaining the raw dataset, wherein the outlier filtration process includes: detecting, by a quantile-based outlier filtration algorithm, outlier data samples of the plurality of data samples that exceed a lower quantile threshold or an upper quantile threshold, generating an intermediate outlier-reduced dataset that includes a subset of the plurality of data samples, wherein the intermediate outlier-reduced dataset excludes the outlier data samples that exceed the lower quantile threshold or the upper quantile threshold, decomposing, by a matrix decomposition algorithm, the intermediate outlier-reduced dataset into a transformed features matrix and a sparse matrix, wherein the transformed features matrix includes a plurality of feature vectors of a plurality of principal components of the intermediate outlier-reduced dataset; and generating a refined outlier-reduced dataset that includes a subset of the plurality of feature vectors, wherein the refined outlier-reduced dataset excludes feature vectors of the transformed features matrix that are associated with an anomalous value in the sparse matrix; training a model using the refined outlier-reduced dataset; and predicting, via the trained model, a value of the target entity at a future time.

In some aspects, the techniques described herein relate to a computer-implemented method, wherein: the sparse matrix includes a plurality of numerical entries, a respective feature vector of the transformed features matrix is associated with a respective numerical entry in the sparse matrix, a value of the respective numerical entry is anomalous when the value of the respective numerical entry corresponds to a non-zero value, and the value of the respective numerical entry is not anomalous when the value of the respective numerical entry corresponds to a zero value.

In some aspects, the techniques described herein relate to a computer-implemented method, wherein: a subset of the plurality of data samples in the raw dataset cause heteroskedasticity and skewness, the refined outlier-reduced dataset excludes the subset of the plurality of data samples that cause the heteroskedasticity and the skewness, and using the refined outlier-reduced dataset to train the model mitigates an impact that the heteroskedasticity and the skewness have on a weight and a bias of the model.

In some aspects, the techniques described herein relate to a computer-implemented method, wherein: the quantile-based outlier filtration algorithm detects that a first subset of the plurality of data samples exceed the lower quantile threshold and that a second subset of the plurality of data samples exceed the upper quantile threshold, and the intermediate outlier-reduced data set: excludes the outlier data samples that exceed the lower quantile threshold and the upper quantile threshold, including the first subset and the second subset of the plurality of data samples, and includes data samples of the plurality of data samples that are within the lower quantile threshold and the upper quantile threshold.

In some aspects, the techniques described herein relate to a computer-implemented method, wherein: the lower quantile threshold and the upper quantile threshold are computed for a first period of time within the raw dataset, the quantile-based outlier filtration algorithm further computes a lower quantile threshold and an upper quantile threshold for at least a second period of time within the raw dataset, and detecting, by the quantile-based outlier filtration algorithm, includes: detecting the outlier data samples of the plurality of data samples that exceed the lower quantile threshold and the upper quantile threshold of the first period of time, and detecting outlier data samples of the plurality of data samples that exceed the lower quantile threshold and the upper quantile threshold of the second period of time.

In some aspects, the techniques described herein relate to a computer-implemented method, wherein: the raw dataset includes a first number of dimensions, and the transformed features matrix represents features of the intermediate outlier-reduced dataset, a subset of the raw dataset, using a smaller number of dimensions than the first number of dimensions.

In some aspects, the techniques described herein relate to a computer-implemented method, wherein: the outlier filtration process includes a plurality of outlier filtration stages, including a first outlier filtration stage and a second outlier filtration stage, the first outlier filtration stage is executed before the second outlier filtration stage and includes: the detecting of the outlier data samples that exceed the lower quantile threshold or the upper quantile threshold, and the generating of the intermediate outlier-reduced dataset, and the second outlier filtration stage is executed after the first outlier filtration stage and includes: the decomposing of the intermediate outlier-reduced dataset, and the generating of the refined outlier-reduced dataset.

In some aspects, the techniques described herein relate to a computer-implemented system including: one or more processors; a memory; a computer-readable medium operably coupled to the one or more processors, the computer-readable medium having computer-readable instructions stored thereon that, when executed by the one or more processors, cause a computing device to perform operations including: obtaining a raw dataset including a plurality of data samples that store historical values of a target entity; executing an outlier filtration process based on obtaining the raw dataset, wherein the outlier filtration process includes: detecting, by a quantile-based outlier filtration algorithm, outlier data samples of the plurality of data samples that exceed a lower quantile threshold or an upper quantile threshold, generating an intermediate outlier-reduced dataset that includes a subset of the plurality of data samples, wherein the intermediate outlier-reduced dataset excludes the outlier data samples that exceed the lower quantile threshold or the upper quantile threshold, decomposing, by a matrix decomposition algorithm, the intermediate outlier-reduced dataset into a transformed features matrix and a sparse matrix, wherein the transformed features matrix includes a plurality of feature vectors of a plurality of principal components of the intermediate outlier-reduced dataset; and generating a refined outlier-reduced dataset that includes a subset of the plurality of feature vectors, wherein the refined outlier-reduced dataset excludes feature vectors of the transformed features matrix that are associated with an anomalous value in the sparse matrix; training a model using the refined outlier-reduced dataset; and predicting, via the trained model, a value of the target entity at a future time.

In some aspects, the techniques described herein relate to a computer-implemented system, wherein: the sparse matrix includes a plurality of numerical entries, a respective feature vector of the transformed features matrix is associated with a respective numerical entry in the sparse matrix, a value of the respective numerical entry is anomalous when the value of the respective numerical entry corresponds to a non-zero value, and the value of the respective numerical entry is not anomalous when the value of the respective numerical entry corresponds to a zero value.

In some aspects, the techniques described herein relate to a computer-implemented system, wherein: a subset of the plurality of data samples in the raw dataset cause heteroskedasticity and skewness, the refined outlier-reduced dataset excludes the subset of the plurality of data samples that cause the heteroskedasticity and the skewness, and using the refined outlier-reduced dataset to train the model mitigates an impact that the heteroskedasticity and the skewness have on a weight and a bias of the model.

In some aspects, the techniques described herein relate to a computer-implemented system, wherein: the quantile-based outlier filtration algorithm detects that a first subset of the plurality of data samples exceed the lower quantile threshold and that a second subset of the plurality of data samples exceed the upper quantile threshold, and the intermediate outlier-reduced data set: excludes the outlier data samples that exceed the lower quantile threshold and the upper quantile threshold, including the first subset and the second subset of the plurality of data samples, and includes data samples of the plurality of data samples that are within the lower quantile threshold and the upper quantile threshold.

In some aspects, the techniques described herein relate to a computer-implemented system, wherein: the lower quantile threshold and the upper quantile threshold are computed for a first period of time within the raw dataset, the quantile-based outlier filtration algorithm further computes a lower quantile threshold and an upper quantile threshold for at least a second period of time within the raw dataset, and detecting, by the quantile-based outlier filtration algorithm, includes: detecting the outlier data samples of the plurality of data samples that exceed the lower quantile threshold and the upper quantile threshold of the first period of time, and detecting outlier data samples of the plurality of data samples that exceed the lower quantile threshold and the upper quantile threshold of the second period of time.

In some aspects, the techniques described herein relate to a computer-implemented system, wherein: the raw dataset includes a first number of dimensions, and the transformed features matrix represents features of the intermediate outlier-reduced dataset, a subset of the raw dataset, using a smaller number of dimensions than the first number of dimensions.

BRIEF DESCRIPTION OF THE DRAWINGS

The present disclosure is described in conjunction with the appended figures:

FIG. 15A illustrates an example of a raw energy demand dataset, according to some embodiments of the present technology;

FIG. 15B illustrates example statistics of a raw energy demand dataset, according to some embodiments of the present technology;

FIGS. 16B-1 and 16B-2 illustrate an example schematic for generating an intermediate outlier-reduced dataset, according to some embodiments of the present technology;

FIGS. 16C-1 and 16C-2 illustrate an example schematic for generating a refined outlier-reduced dataset, according to some embodiments of the present technology;

FIGS. 18D-1 and 18D-2 illustrate a performance of various trained machine learning models, according to some embodiments of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
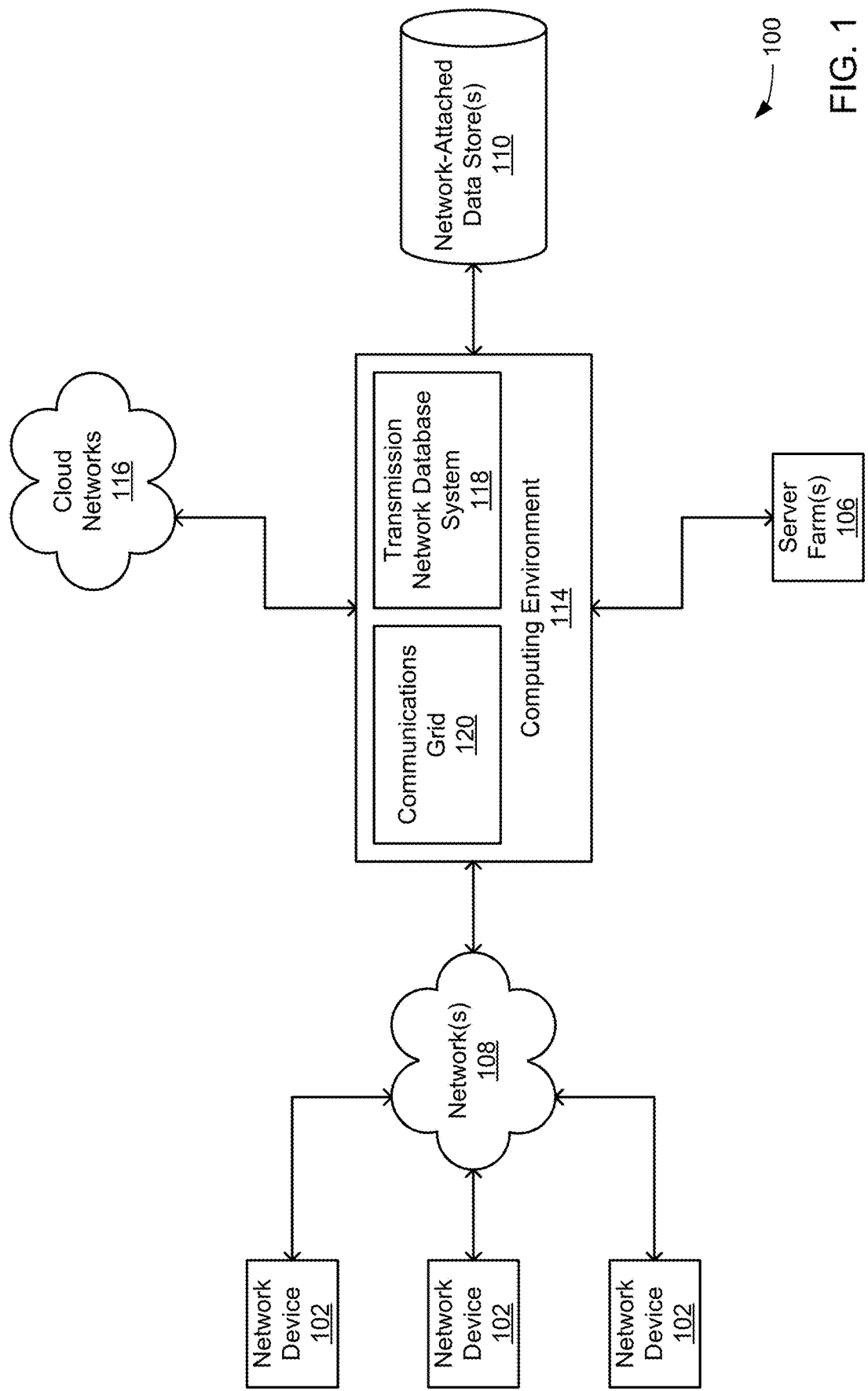
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
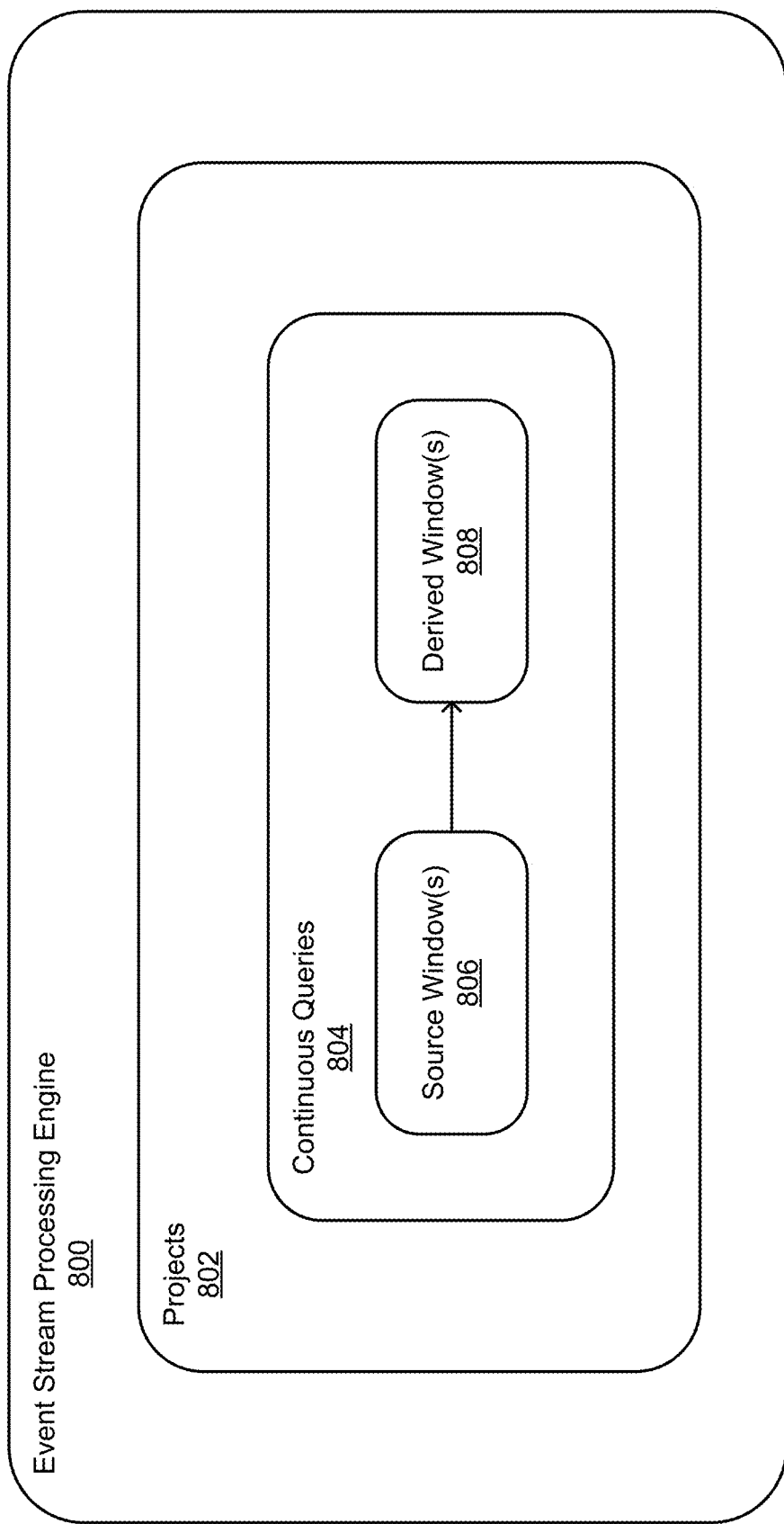
FIG. 8 illustrates a block diagram including components of an Event Stream Processing Engine (ESPE), according to embodiments of the present technology.
Figure 9:
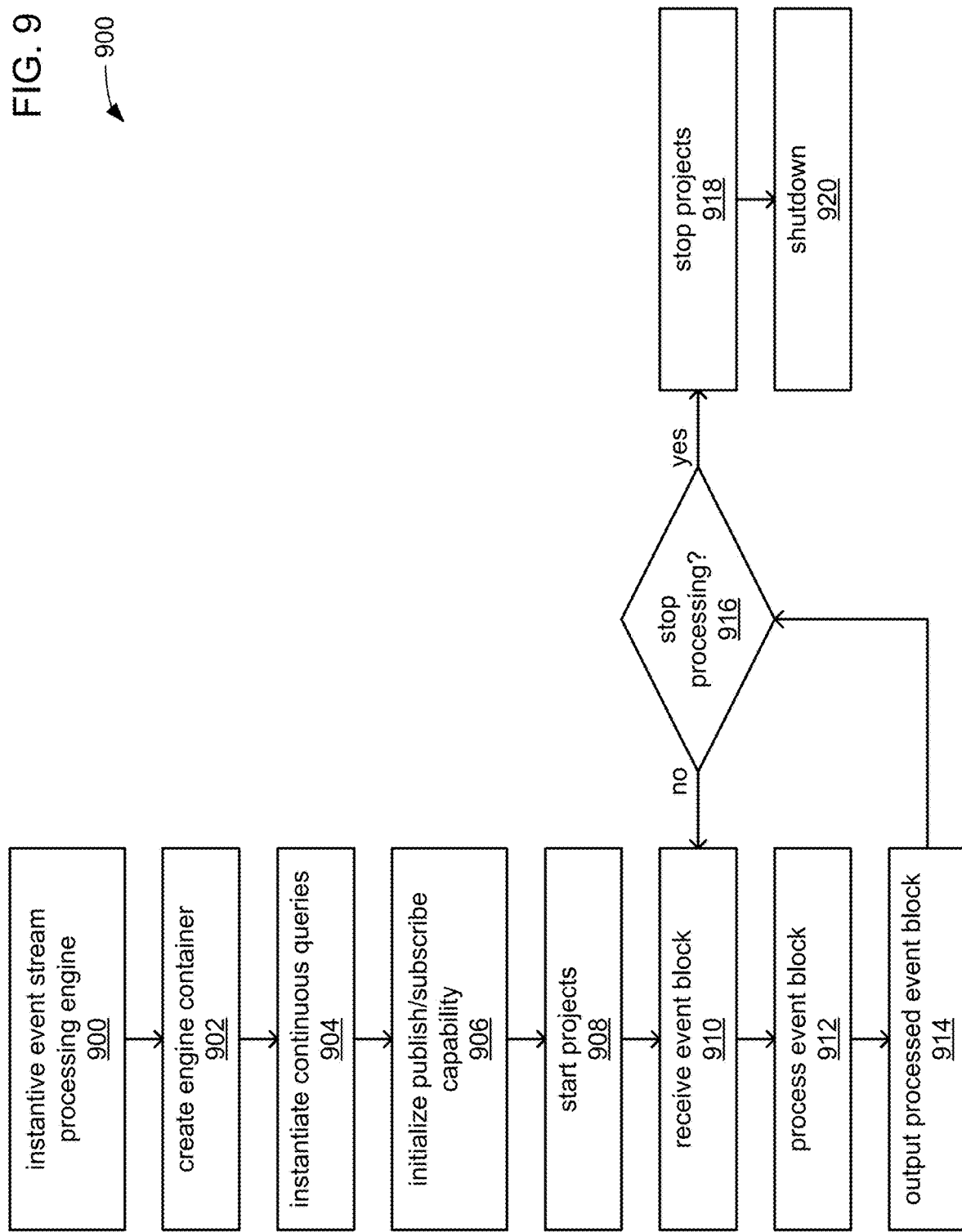
FIG. 9 illustrates a flow chart showing an example process including operations performed by an event stream processing engine, according to some embodiments of the present technology.
Figure 10:
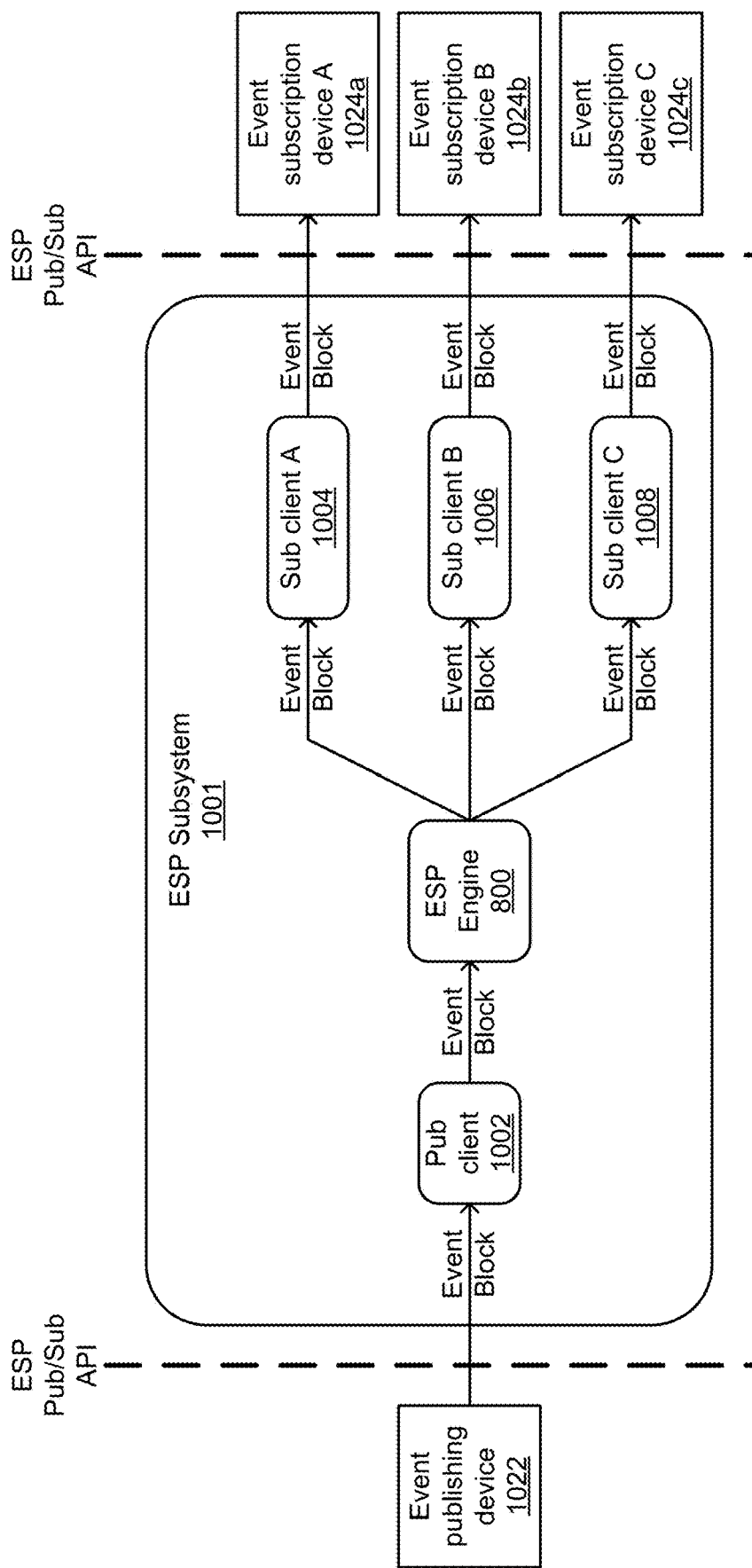
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
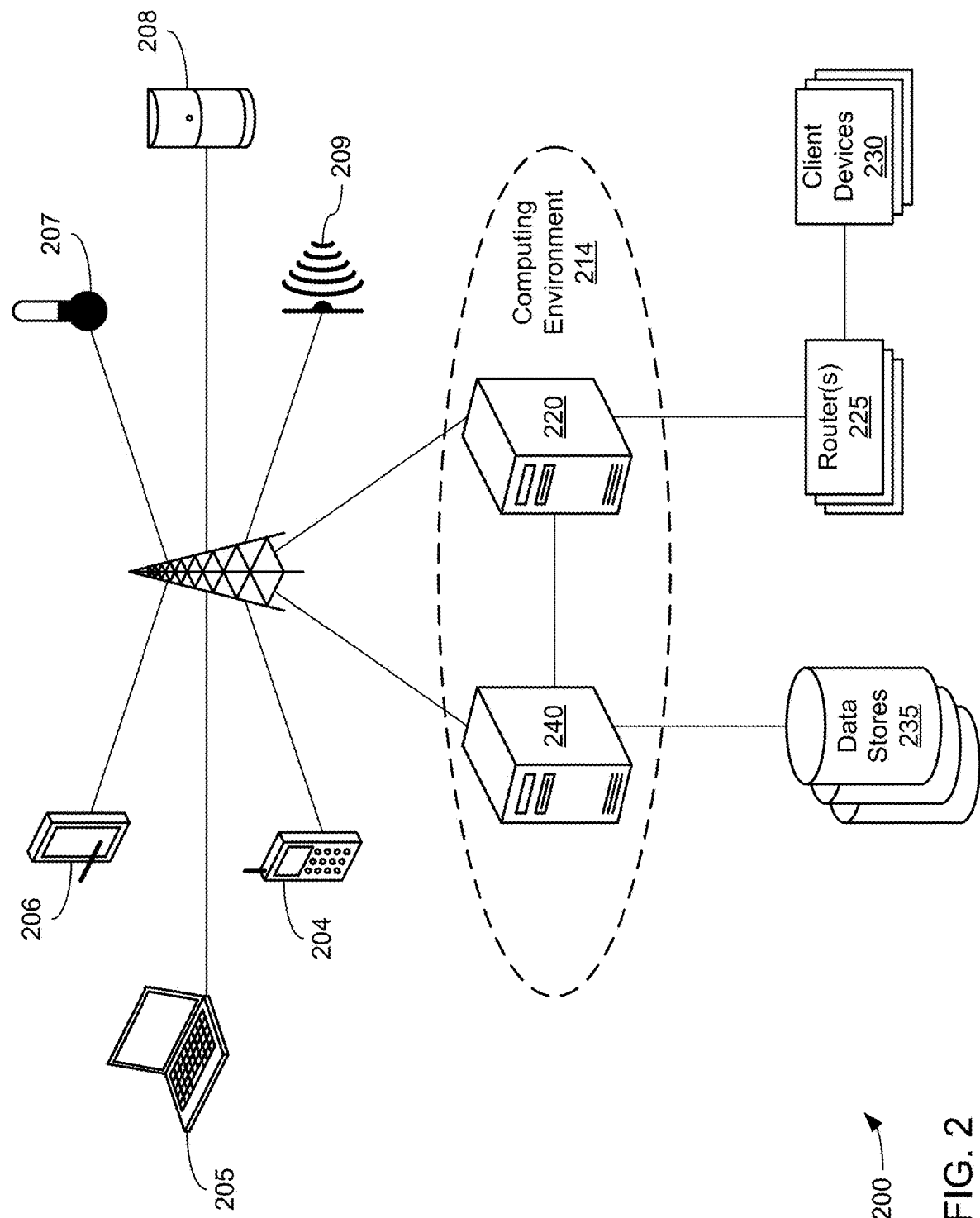
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like.

Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
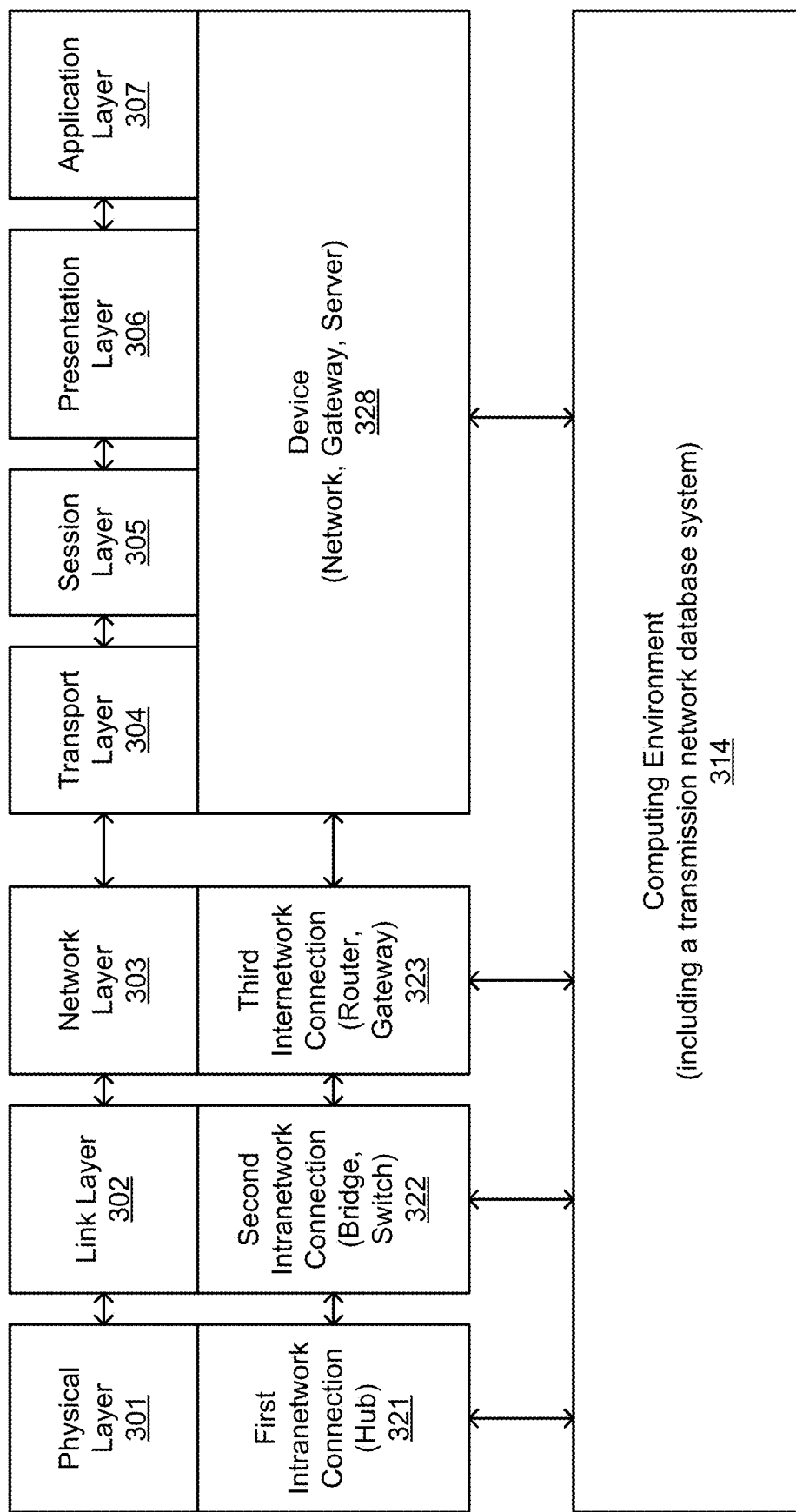
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
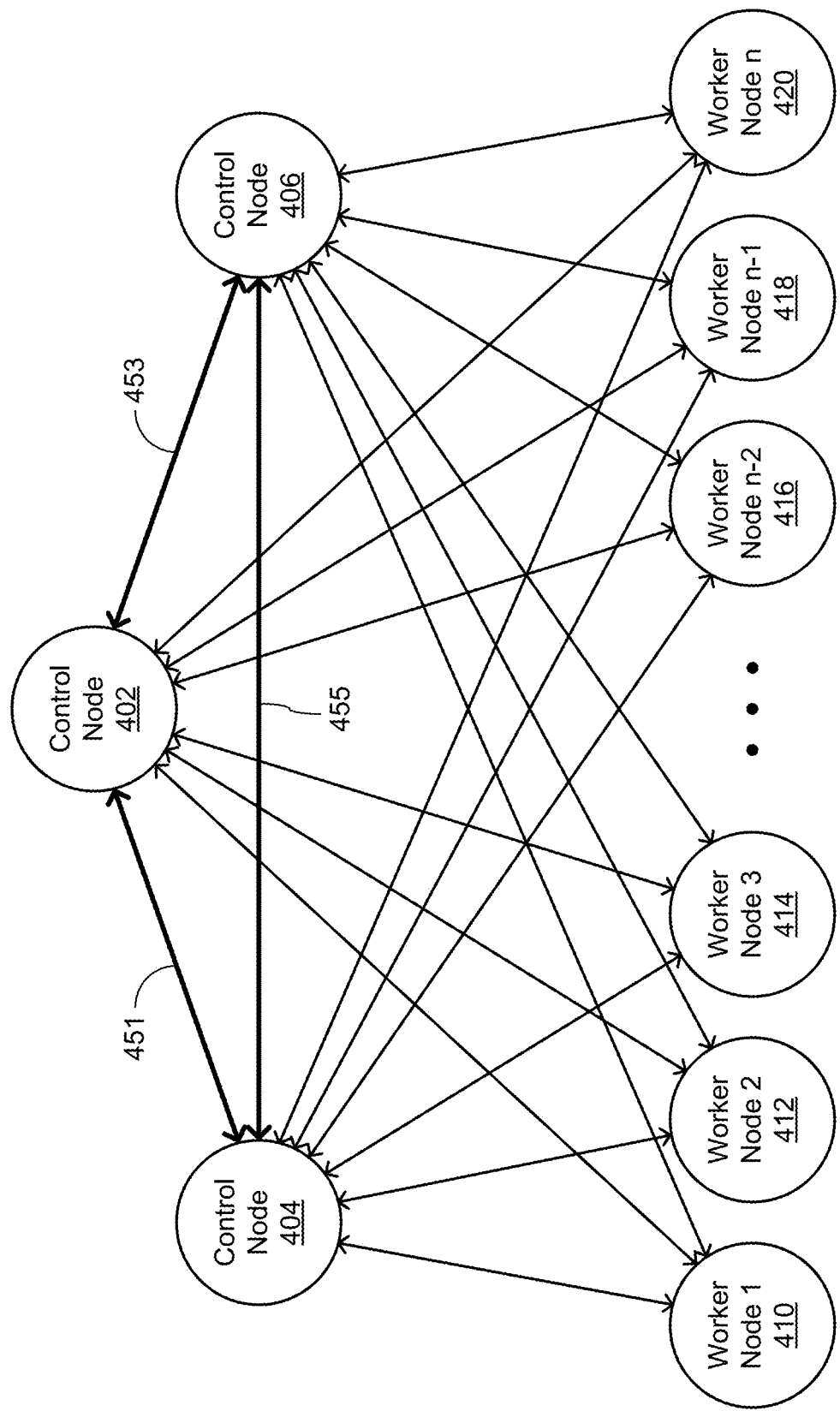
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
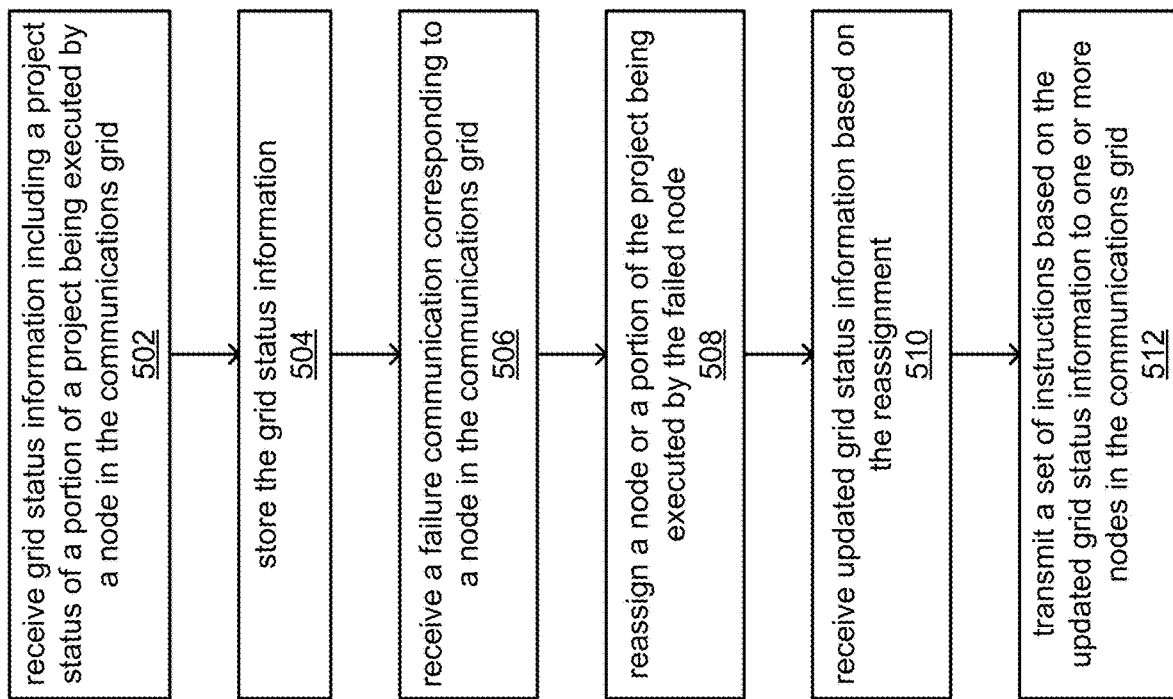
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
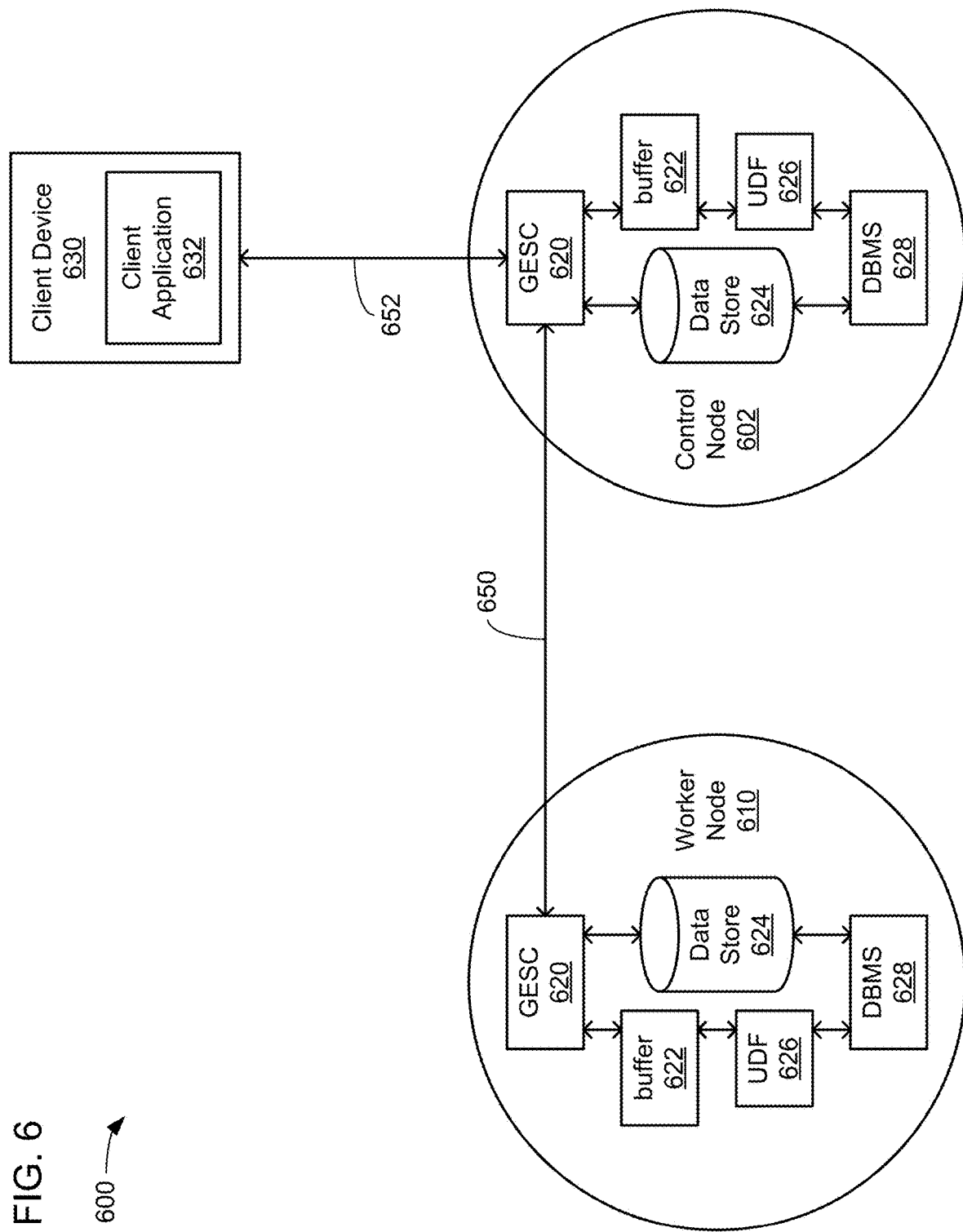
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
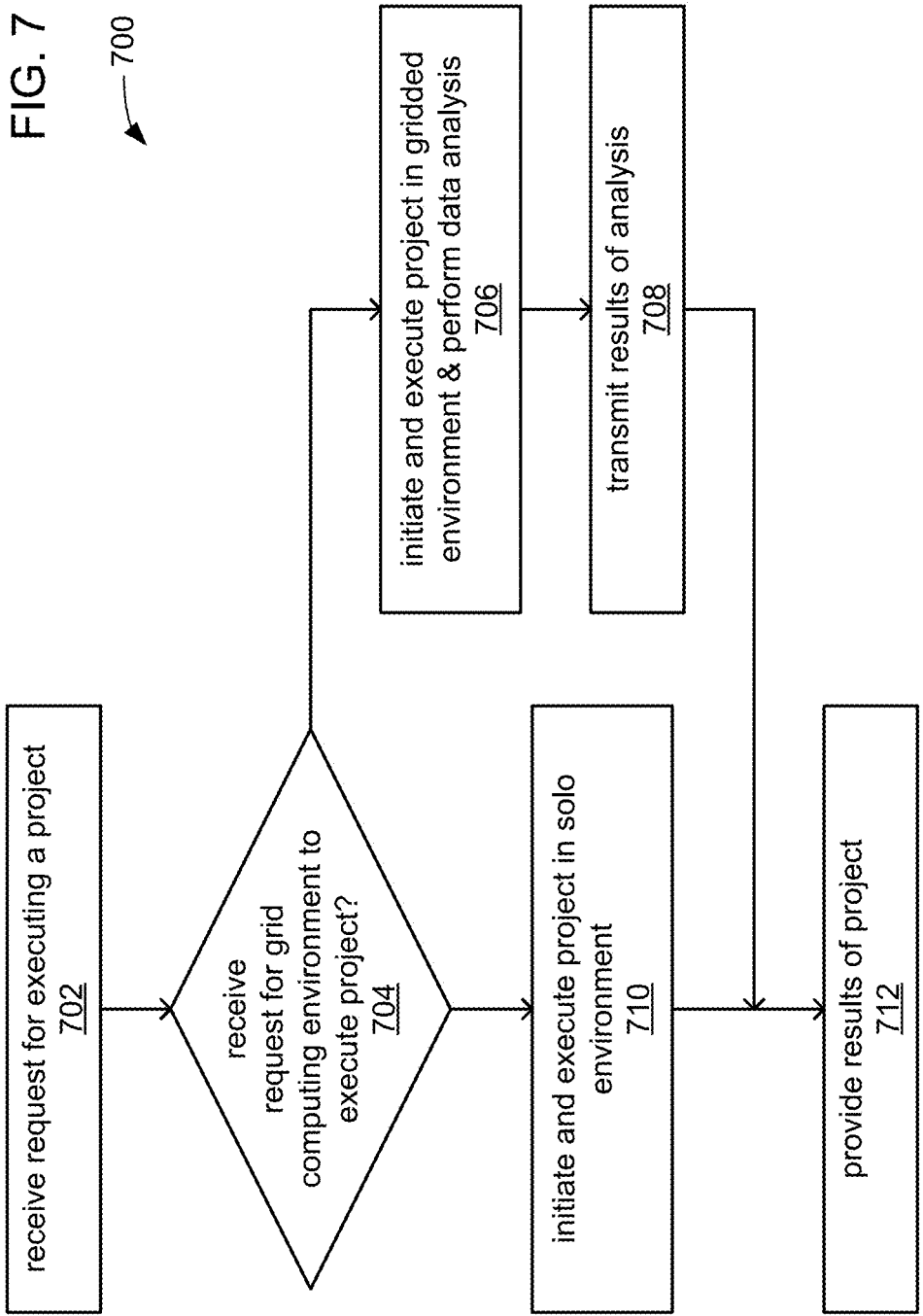
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
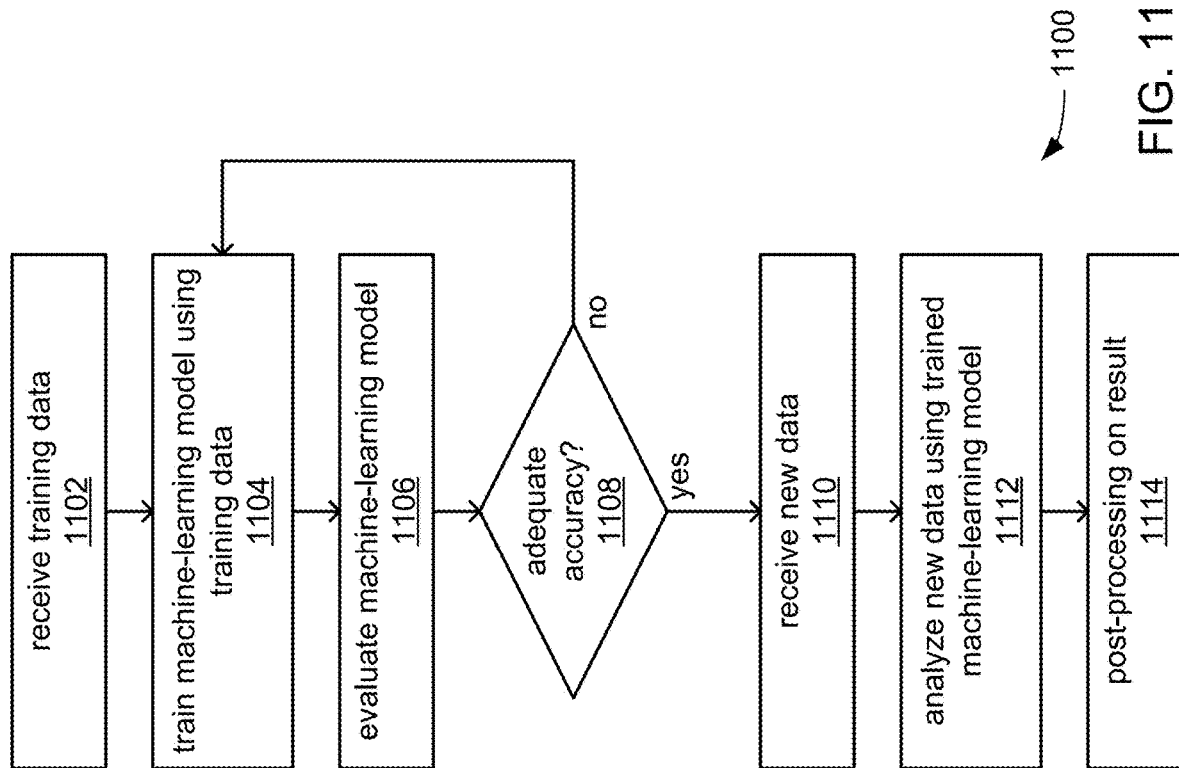
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
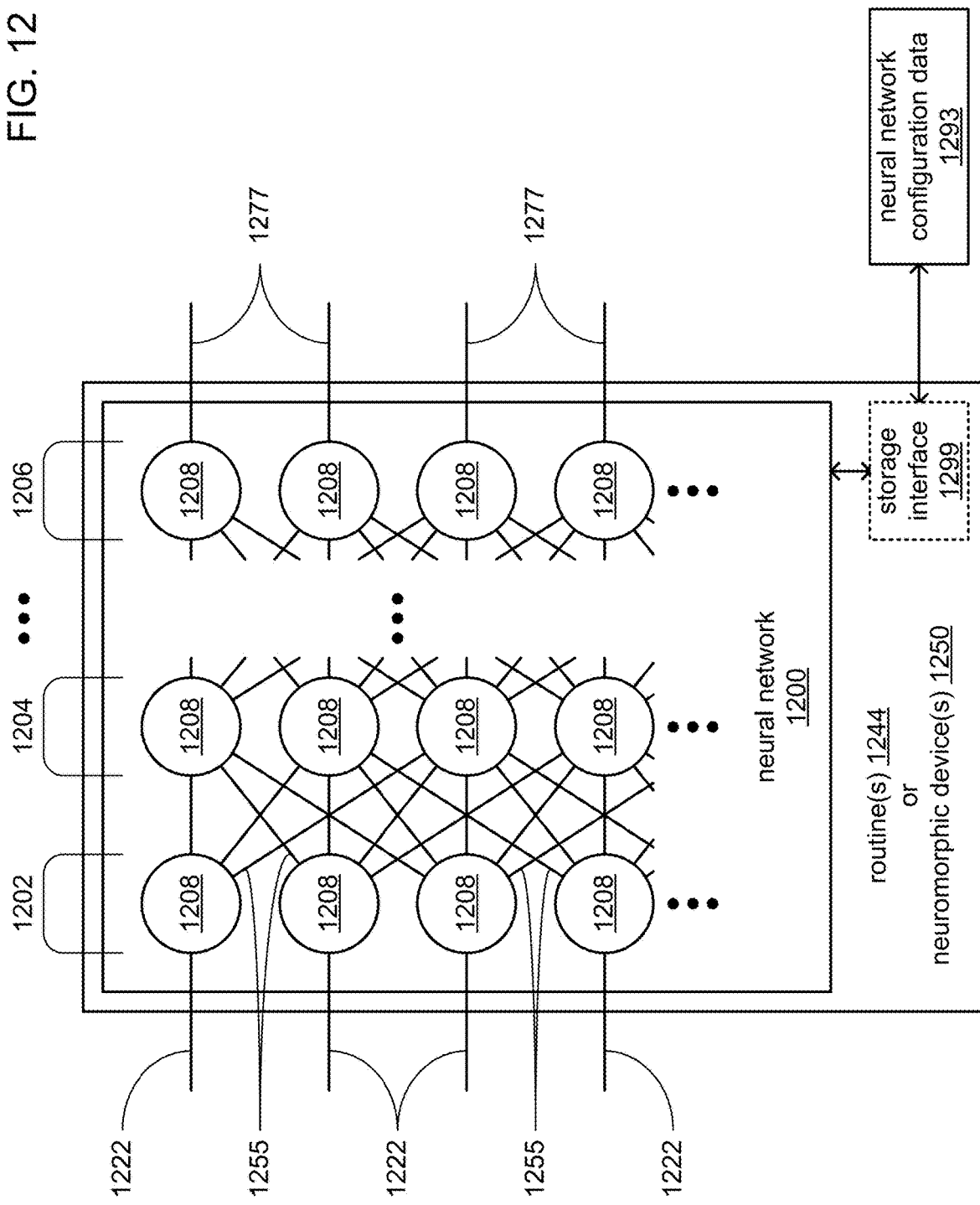
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max (x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
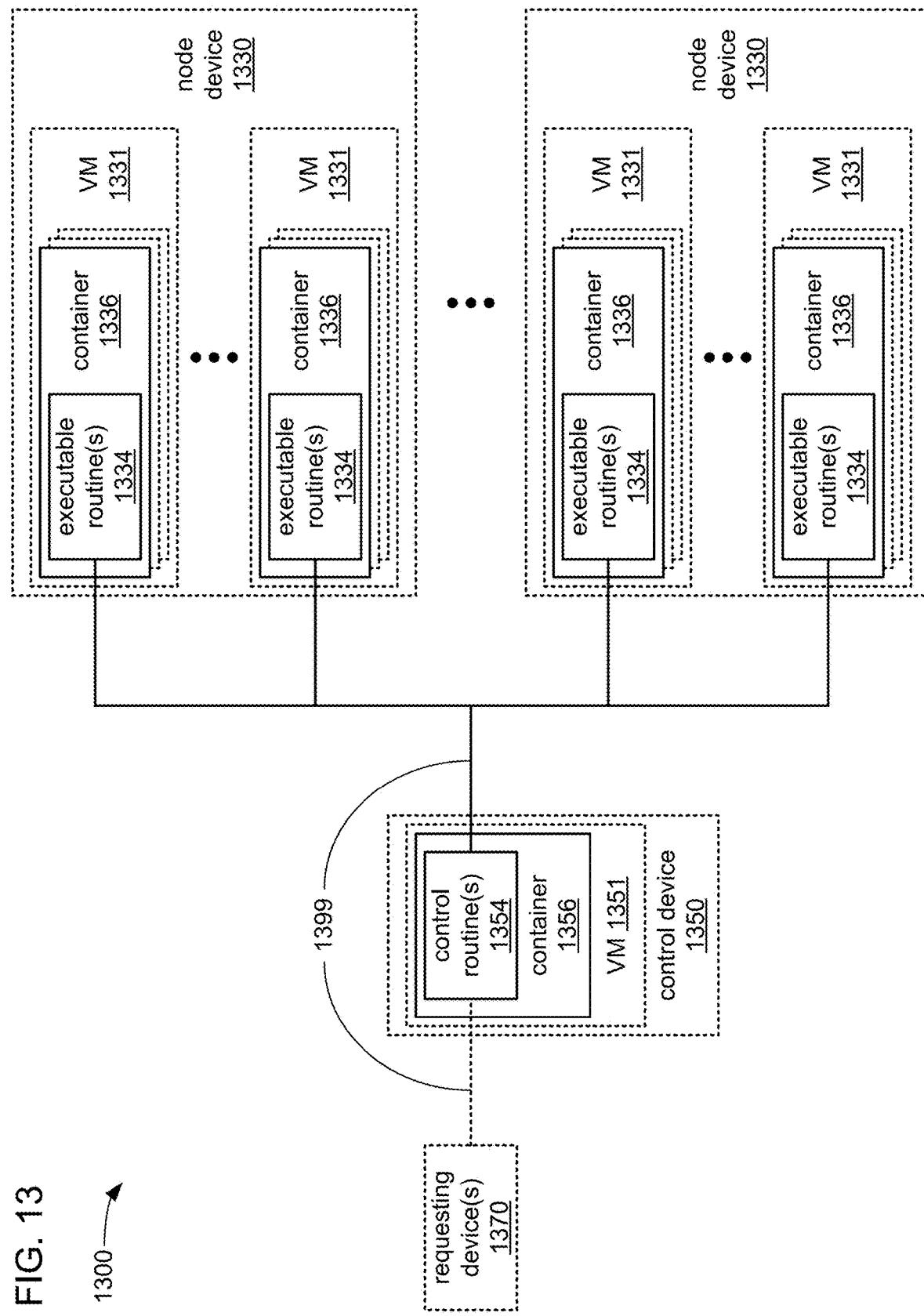
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Associated Processes

Figure 14:
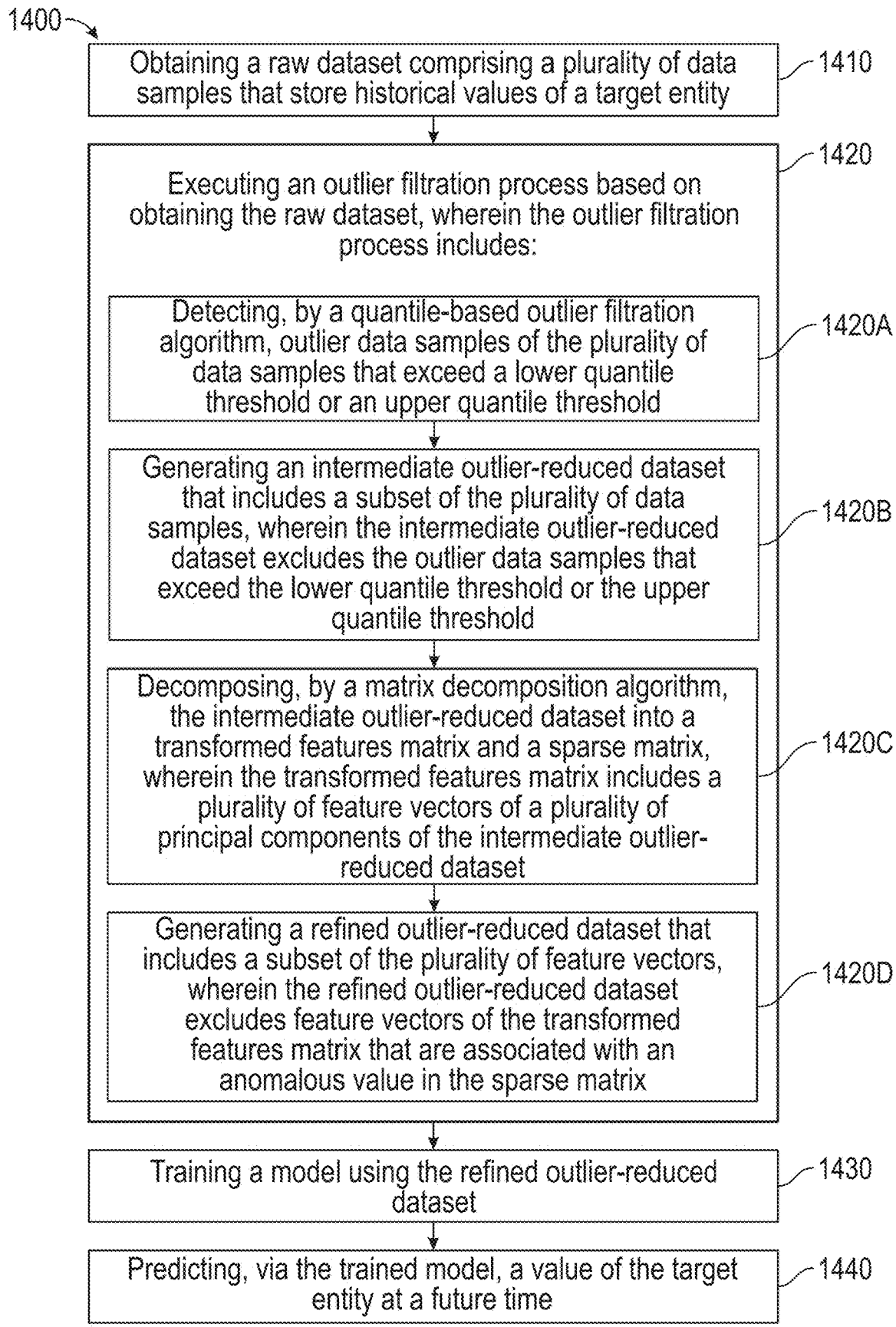
FIG. 14 illustrates a method for detecting and removing outliers in a raw dataset, according to some embodiments of the present technology.

Referring to FIG. 14, an advanced scientific computing method for enhancing preprocessing methodologies applied to training datasets is illustrated, employing Robust Principal Component Analysis (RPCA) combined with quantile threshold preprocessing. FIG. 14 illustrates one embodiment of method 1400 for enhancing preprocessing methodologies in training data sets using RPCA and quantile threshold preprocessing. It shall be appreciated that other embodiments are possible and configurable according to the needs presented by different datasets and analytics requirements.

This method 1400, and/or an associated system, capitalizes on sequential mathematical and statistical techniques to refine data quality significantly, thereby optimizing datasets for more efficient and accurate predictive modeling, particularly in scenarios involving vast and historically rich datasets.

Method 1400 results in many technical benefits over conventional data preprocessing techniques. For example, unlike conventional techniques that often overlook the impact of outliers, method 1400 robustly identifies and mitigates outlier effects using quantile-based thresholding, ensuring the integrity of the dataset is maintained throughout the preprocessing phase. Additionally, outlier filtration process 1420 includes functionality for detailed logging and reporting of detected outliers, providing valuable insights into the nature of data anomalies and aiding in further refinement of data cleansing strategies.

Further, in some embodiments, method 1400 leverages RPCA to effectively decompose datasets into meaningful components, thereby enhancing the subsequent machine learning model's ability to discern patterns and make accurate predictions. It shall be noted that the methods described herein are not limited to any specific dataset type or industry application and can be applied to various technological domains that require robust data preprocessing to enhance model accuracy and efficiency.

As shown in FIG. 14, method 1400 may initiate with Data Acquisition Process 1410. Data Acquisition Process 1410 may involve obtaining a raw dataset comprising a plurality of data samples that store historical values of a target entity. This raw dataset may include a multitude of data samples each storing historical values of a target entity, such as energy usage readings, electricity supply values, energy demand readings, and/or the like. These data samples may vary in size, type, and complexity, depending on the source and nature of the data collected. In some embodiments, each data sample within a raw dataset is pre-processed using a standardized normalization procedure to ensure uniformity and scale consistency across the dataset, which may be fundamental for effective subsequent quantile-based outlier detection.

Additionally, Data Acquisition Process 1410 may be configured to interface directly with multiple data source inputs, enabling seamless data aggregation and synchronization across platforms. This functionality underlies the system's capacity to handle real-time data streaming and batch data processing efficiently. The raw dataset acts as the foundational input required for the subsequent data processing operations, setting the stage for the advanced analytical techniques that follow.

In some aspects, method 1400 may proceed to include outlier filtration process 1420. Following the outlier detection of process 1420 (e.g., subprocesses 1420A-1420D), outlier filtration process 1420 may extend to automatically recalibrate the quantile thresholds based on the evolving nature of the data, employing adaptive algorithms that learn from previous detection cycles to enhance the accuracy of outlier identification over time.

Outlier filtration process 1420 may execute an outlier filtration process based on obtaining the raw dataset, wherein the outlier filtration process may include detecting, by a quantile-based outlier filtration algorithm, outlier data samples of the plurality of data samples that exceed a lower quantile threshold or an upper quantile threshold. In some embodiments, the process may include the application of advanced statistical metrics to establish the quantile thresholds dynamically based on the distribution characteristics of the dataset, enhancing the adaptability of the system to different data anomalies. Central to the system's preprocessing phase, the execution of outlier filtration process 1420 may entail several meticulously defined steps geared towards identifying and filtering out statistical outliers.

This may be principally achieved by employing a quantile-based outlier filtration algorithm in Process 1420A, which meticulously examines the dataset to detect samples that fall beyond the predefined lower and upper quantile thresholds. These thresholds may be mathematically determined based on the distribution characteristics of the dataset, ensuring that the filtration is both precise and adaptable to different types of data distributions.

Fundamental to refining the dataset with method 1400, this quantile-based outlier filtration algorithm in Process 1420A may leverage statistical theories such as the interquartile range method mixed with skewness reduction techniques to precisely identify outlier data samples. The detected outliers are those samples whose values lie outside the set quantile thresholds, possibly caused by data entry errors, measurement inaccuracies, or genuine anomalies.

Following outlier detection of process 1420A, the generation of an intermediate outlier-reduced dataset in Process 1420B involves the creation of an intermediate dataset that has been purged of the identified outliers. This dataset, therefore, represents a more homogenous and statistically consistent subset of data samples, which may be critical for the reliability of the subsequent decomposition and analysis processes.

The decomposition by matrix decomposition algorithm 1420C is pivotal as it employs a matrix decomposition algorithm to split the intermediate outlier-reduced dataset into a transformed features matrix and a sparse matrix. This decomposition may be executed via an RPCA approach, which separates principal components (significant information or features of a dataset) from the sparse components (noise, outliers, and/or non-significant features of a dataset).

The transformed features matrix may encapsulate principal components derived from the dataset, which are essential for capturing the underlying patterns necessary for effective model training. The sparse matrix, on the other hand, contains elements (e.g., data samples) representing anomalies or noise, further aiding in dataset refinement by isolating less informative or disruptive data points. In some aspects, a value of a numerical entry in a feature vector in a sparse matrix is anomalous when it corresponds to a non-zero value, and not anomalous when it corresponds to a zero value. In some embodiments, the transformed features may be obtained using a principal component analysis without the robust principal component analysis approach indicated above.

An output of a refined outlier-reduced dataset 1420D may be generated after undergoing another layer of refinement, where only those feature vectors from the transformed features matrix, which are not associated with anomalous values in the sparse matrix, are retained. This selective retention ensures that the dataset used for training the predictive model is of optimal quality, devoid of any distortive elements that could affect the model's performance.

In some aspects, each detected outlier may be analyzed to determine its potential impact on the overall dataset, and decisions regarding their inclusion or exclusion in the refined outlier-reduced dataset 1420D may be made based on a combination of automated criteria and optional manual review, ensuring that each data point contributes positively to the model's training efficacy.

A subsequent step in method 1400 is Model Training Process 1430 that includes training a model using the refined outlier-reduced dataset. This model training may involve advanced and/or statistical algorithms that may include regression analysis, machine learning techniques, or even deep learning frameworks depending on the complexity and requirements of the task at hand. These algorithms adjust their parameters iteratively to minimize prediction errors, effectively learning from the processed dataset to forecast future values of the target entity. In some aspects, these future values may be 24 hours ahead of a current time and/or one period ahead of the current time.

The next step in method 1400 is predicting, via a trained model, a value of the target entity at a future time 1440. The culmination of the preprocessing and training operations is the system's capability to predict future values of the target entity. The predictive model applies the learned insights to new or subsequent data, calculating the probable future states of the entity based on historical trends and patterns observed in the dataset.

In some aspects, software and algorithmic enhancements emerge from or present themselves in method 1400. Software functionalities integral to this system include data handling routines, outlier detection logistics, and decomposition algorithms. These may be developed using robust programming languages like Python, R, or another programming language suitable for manipulating data or for scientific computing. The system's flexibility allows for adjustments in algorithm parameters, threshold settings, and model configurations, making it adaptable to various predictive scenarios.

Building upon the aforementioned process, the method may further refine the outlier detection by incorporating one or more other machine learning techniques to predict potential outlier thresholds across various dataset states, thus optimizing the filtration process continuously. For example, an adaptive threshold recalibration (not illustrated in FIG. 14) may ensure that the system remains robust against dynamic changes in the data characteristics, maintaining high processing integrity and reliability.

The rigorous approach to data preprocessing depicted in FIG. 14 ensures a high degree of data integrity and robustness, making method 1400 and associated systems, important tools in the arsenal of data scientists and analytics professionals across various sectors, to significantly advance predictive analytics and machine learning applications.

This system and method finds practical applications across numerous sectors, most notably in energy for demand forecasting, risk assessment, and for storage and supply management. By providing a method to prepare highly reliable datasets, the system ensures that businesses can make informed decisions based on accurate predictions, thus maintaining sufficient risk mitigation preparedness including when it comes to energy supply and demand forecasting and storage or grid management. This may have the effect of reducing surprise spikes and over-burdened grid utilization due to partially skewed, noisy, outlier-prone, incomplete, or incorrect forecasting data. Further industrial use-cases may be found across a variety of industry and technological domains, such as healthcare data management, retail inventory forecasting, energy markets, and energy consumption analysis.

Overall, FIG. 14 delineates a comprehensive and technically sophisticated system designed to preprocess training datasets effectively using RPCA and quantile threshold preprocessing to enhance predictive modeling accuracy. This detailed figure description not only sheds light on the individual components and their functionalities but also emphasizes the system's broad applicability and adaptability, as further elucidated by the following figures and detailed descriptions.

Stated another way, in some embodiments, method 1400 may include processes 1410-1440. Process 1410 may obtain a raw dataset comprising a plurality of data samples that store historical values of a target entity. Process 1420 may execute an outlier filtration process based on obtaining the raw dataset. Process 1420 may include one or more subprocesses 1420A-1420D. Subprocess 1420A may detect, by a quantile-based outlier filtration algorithm, outlier data samples of the plurality of data samples that exceed a lower quantile threshold or an upper quantile threshold. Subprocess 1420B may generate an intermediate outlier-reduced dataset that includes a subset of the plurality of data samples, wherein the intermediate outlier-reduced dataset excludes the outlier data samples that exceed the lower quantile threshold or the upper quantile threshold. Subprocess 1420C may decompose, by a matrix decomposition algorithm, the intermediate outlier-reduced dataset into a transformed features matrix and a sparse matrix, wherein the transformed features matrix includes a plurality of feature vectors of a plurality of principal components of the intermediate outlier-reduced dataset. Lastly, subprocess 1420D may generate a refined outlier-reduced dataset that includes a subset of the plurality of feature vectors, wherein the refined outlier-reduced dataset excludes feature vectors of the transformed features matrix that are associated with an anomalous value in the sparse matrix.

Furthermore, process 1430 may train a model using the refined outlier-reduced dataset, and process 1440 may predict, via the trained model, a value of the target entity at a future time.

Referring to FIGS. 15A and 15B, these figures depict a comprehensive dataset system designed to enhance the management and analysis of energy consumption data, specifically optimized for the scenario of applying robust principal component analysis (RPCA) and quantile threshold preprocessing for training datasets within the energy sector. This system facilitates accurate predictions and optimizations in energy usage by employing advanced data collection and statistical analysis techniques, integral to modern energy management practices.

In FIG. 15A, Raw Dataset 1500 (e.g., an example of a raw dataset obtained by process 1410) is shown to include Timestamp 1502A. Timestamp 1502A may function as the primary chronological identifier for each dataset entry, recording data at precise, pre-defined intervals. The granularity of data collection, typically hourly or minutely, may be crucial for temporal resolution in energy consumption patterns. In some aspects, these time series data samples may be recorded at pre-defined intervals over a period of time. In other aspects, this component is fundamental for time-series analysis across multiple energy management scenarios.

Further shown are Energy Demand-related Columns 1502B-1502D. The columns Yesterday Value 1502B, Yesterday Load 1502C, and Yesterday Average Load 1502D contain historical energy consumption data for the previous days, allowing comparative analysis over time to detect patterns or anomalies in energy usage. In some cases, "YDay_Value" may represent yesterday's price for an hour, "YDay_Load" may represent yesterday's load/demand for that hour, and/or "YAve_Load" may represent yesterday's average load/demand, which is a constant value for a 24-hour period (or for the timeframe associated with a respective row 1504A-1504Z). These may be utilized in algorithms that assess daily fluctuations and predict future demands based on historical data. The interaction between these columns and the RPCA algorithm helps in identifying underlying patterns that may not be apparent from raw data alone.

Calendar Data Columns 1502E-1502H provide additional temporal dimensions to the data, enriching the analysis by allowing seasonal and periodic evaluations. The "Month" column 1502E, "DOW (Day of Week)" column 1502F, "DOM (Day of Month)" column 1502G, and "DOY (Day of Year)" column 1502H provide additional temporal markers that assist in seasonal, weekly, and annual energy consumption analysis. These markers are crucial for correlating energy demands with specific times, enhancing the model's predictive accuracy. These columns are used in conjunction with machine learning models to correlate energy usage with time-based variables, enhancing the accuracy of predictive models.

The Current Demand column 1502I records the latest energy demand measurements, critical for real-time monitoring and immediate data-driven decision-making. Current Demand column 1502I captures real-time energy consumption data, essential for immediate decision-making and system feedback mechanisms. This data aids in real-time monitoring and adjustments in energy distribution systems, utilizing rapid processing algorithms to adapt to current demand without delay. In some portions of the disclosure, column 1502I may be referred to as a "demand value column" that stores the historical values of a target entity.

In other aspects, FIG. 15B depicts a statistical analysis of raw dataset 1500 that summarizes the historical data metrics across different years, providing a macroscopic view of data trends. Statistical Summary Table 1506 aggregates and summarizes energy consumption over multiple years, providing high-level insights through various statistical metrics established on historical data. Such comprehensive data analysis supports strategic planning and forecasting in energy management.

Statistical Summary Table 1506 includes various statistical measures such as "Count," "Mean," "Standard Deviation," "Minimum," "25%," (e.g., first quartile (Q1)) "50%," (e.g., median quartile (Q2)) "75%," (e.g., upper quartile (Q3)), and "Maximum." In some aspects, these metrics may be essential for understanding the distribution, variability, and extremities of energy consumption over the years listed. The table employs statistical measures like mean, standard deviation, and quartiles, which are calculated using advanced statistical functions that analyze trends and variability in energy usage. It shall be noted that, in some embodiments, the statistical measures illustrated in FIG. 15B may be distinctly computed for one or more respective columns of raw dataset 1500 (e.g., a first set of statistical measures for column 1502B, a second set of statistical measures for column 1502C, a third set of statistical measures for column 1502D, a fourth set of statistical measures for column 1502I (e.g., a demand value column), etc.)

In other aspects, the method-supporting system's software components may be engineered using sophisticated programming languages known for statistical and data analysis such as Python or R. This supports algorithms for RPCA, which decomposes an energy dataset (e.g., a dataset derived from dataset 1500 in FIG. 15A) into matrices that succinctly represent normal consumption patterns and anomalies. These matrices may critically enable the isolation of significant features from the noise, a key step in data preprocessing for predictive modeling.

An example of an underlying data collection operation may begin with data acquisition of dataset 1500 in FIG. 15A, where sensors, API connections, and data loggers may first be used to collect and transmit energy usage data to the system. This data may be first processed for quality and integrity before being stored in the structured format shown. Subsequent statistical analysis associated with FIG. 15B may evaluate long-term trends and anomalies on a per-column or multi-column basis. The processed data may then undergo RPCA, enhancing the dataset by reducing dimensionality and highlighting significant features used in machine learning models for prediction. The system is designed to be capable of handling large datasets with high-speed processing requirements.

Lower quantile and upper quantile thresholds may be calculated based on the first and third quartiles of a demand value dataset (e.g., 25% and 75%), respectively. The calculation for the lower quantile threshold may be the first quartile minus a product between a pre-defined scaling factor (e.g., a value of 1, 1.5, 2, 3, 4, etc.) and an interquartile range of the demand value data (e.g., a difference between the third quartile of the (e.g., demand value) column and the first quartile of the (e.g., demand value) column). Similarly, the calculation for the upper quantile threshold may be calculated as a third quartile of the demand value column plus the product between the pre-defined scaling factor and the interquartile range of the demand value data. Parameters such as data collection frequency, threshold values for outlier detection, and quantile specifications for data segmentation may be meticulously redesigned to ensure optimal performance.

The described method and system can be adapted to various data types and scales, from small facilities to large metropolitan energy grids and geographies. Alternative embodiments may include variations in the statistical methods used, the integration of additional data sources like weather-related, regulatory, or economic indicators, and the application of different machine learning algorithms for final model training. While the system is demonstrated in the context of energy data management, the methodologies and technologies applied can be adapted for other types of time-series data analytics, such as financial markets or meteorological data. Modifications can include adjustments in data granularity, incorporation of additional predictive variables, or application of alternative machine learning algorithms for data analysis.

The system is designed to seamlessly integrate with existing energy management infrastructures, including smart grid technologies and IoT devices. Interfaces and APIs are structured to facilitate easy data ingestion from diverse sources and to ensure compatibility with industry-standard software and hardware. This system and method support communicating via standardized APIs that facilitate data exchange between different utilities, marketplaces, and energy management systems. This interoperability is crucial for adapting to various technological environments and enhancing system functionality through external data sources.

In practical scenarios, such as in smart grid management, the system can predict peak demand periods and inform management of a need to adapt energy supply accordingly. For instance, by analyzing historical and real-time data, utility companies can implement improved dynamic pricing models to encourage energy usage during off-peak hours, thus balancing the load on the grid and preventing outages.

Figure 16A:
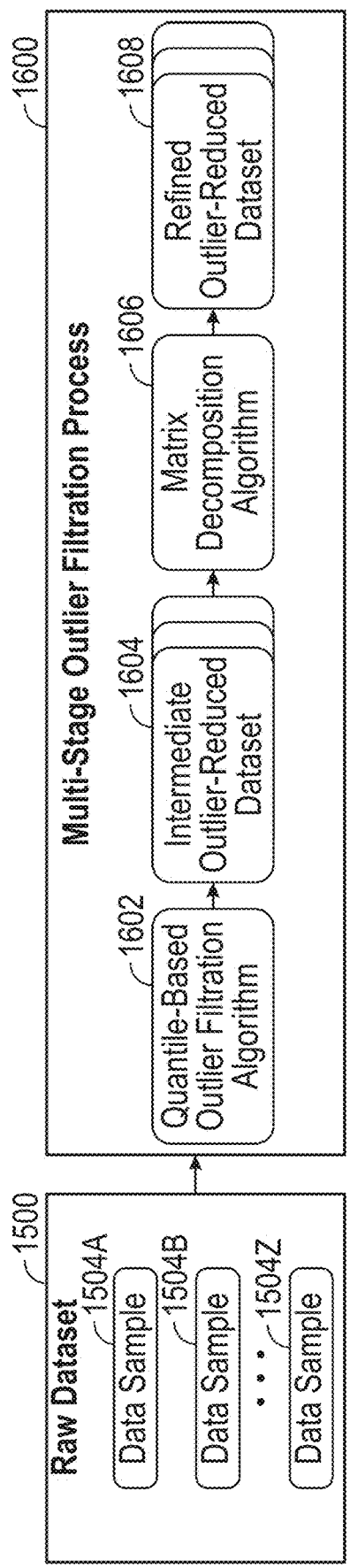
FIG. 16A illustrates an example of a multi-stage outlier filtration process, according to some embodiments of the present technology.

Referring now to FIG. 16A, the figure illustrates a multi-stage outlier filtration process (e.g., an example of process 1420 in FIG. 14) integrated within systems and methods for combining Robust Principal Component Analysis (RPCA) and quantile threshold preprocessing for training datasets. This method assimilates robust data handling methodologies, including RPCA (Robust Principal Component Analysis) and quantile threshold preprocessing, to optimize the data quality and robustness of the models trained on such datasets.

This figure articulates a systematic approach to enhancing the data quality by progressively filtering and refining data samples through a series of technologically advanced steps aimed at improving the reliability of subsequent data analyses and model training.

In certain aspects, the foundation of the depicted method begins with the collection of raw data, illustrated here as Raw Dataset 1500. This dataset comprises multiple data samples, including Data Sample 1504A, Data Sample 1504B, and continuing on without limit, showing another Data Sample 1504Z. Each data sample stores historical values that are essential for the subsequent predictive modeling. Raw Dataset 1500 provides the initial set of data from which outliers will be identified and removed in the later stages of the process.

In various aspects, Multi-Stage Outlier Filtration Process 1600 initiates with Quantile-based Outlier Filtration Algorithm 1602. This algorithm is designed to sift through the Raw Dataset 1500 to detect and exclude data points (e.g., data samples) that do not conform to specified quantile thresholds. This step serves as the first layer of data cleansing, ensuring that the data proceeding to the next stages is devoid of extreme values that could skew the overall analysis. The algorithm efficiently identifies outliers exceeding either the lower or upper quantile thresholds, which are predetermined based on the data's distribution characteristics.

In several aspects, following the initial outlier detection and removal, the data that meets the designated criteria moves forward to Intermediate Outlier-Reduced Dataset 1604. This dataset represents a refined collection of data samples, where only those samples that fall within the acceptable quantile range are included. This intermediate dataset balances the retention of valuable data while excluding potential outliers, thereby maintaining the integrity of the dataset for more accurate and reliable processing in subsequent steps.

In other aspects, Matrix Decomposition Algorithm 1606 plays a pivotal role in further refining the data by decomposing the Intermediate Outlier-Reduced Dataset 1604. The decomposition involves separating the dataset into principal components that highlight the most significant features (or combination of features) for analysis while simultaneously identifying and isolating less relevant or noisy data. This subset of the raw dataset (e.g., the principal components of such dataset) may use a smaller number of dimensions than the raw dataset. For example, the raw dataset may include a first number of dimensions (e.g., 7 columns (also referred to as feature columns or features)) and the principal components may equivalently or approximately represent those columns using a small number of dimensions (e.g., 2, 3, 4, etc. feature columns). It shall be noted that the values of one or more principal component for a respective data sample may be stored in or using a vector ("feature vector" or "feature array").

In many aspects, the culmination of this multi-stage process is represented by the Refined Outlier-Reduced Dataset 1608. This dataset is the product of the meticulous filtration and decomposition processes described previously. It includes only those data points and feature vectors from the decomposed dataset that are free from anomalies associated with extreme outlier values. This refinement process ensures that the dataset is not only clean but also optimized for training robust predictive models. This final data set is characterized by its enhanced quality and reliability, making it an ideal candidate for training models that require high accuracy and reliability.

The described multi-stage outlier filtration process, as illustrated in FIG. 16A, encompasses a comprehensive and detailed approach to preparing datasets for predictive modeling in various applications. Each component of the process is interconnected, with each stage building upon the previous to enhance the dataset's quality progressively. A computer hardware implementation supporting Multi-Stage Outlier Filtration Process FIG. 16A will have the computing power to efficiently filter, decompose, and refine data, harnessing these substantial improvements over conventional methods.

Figures 1, 16B:
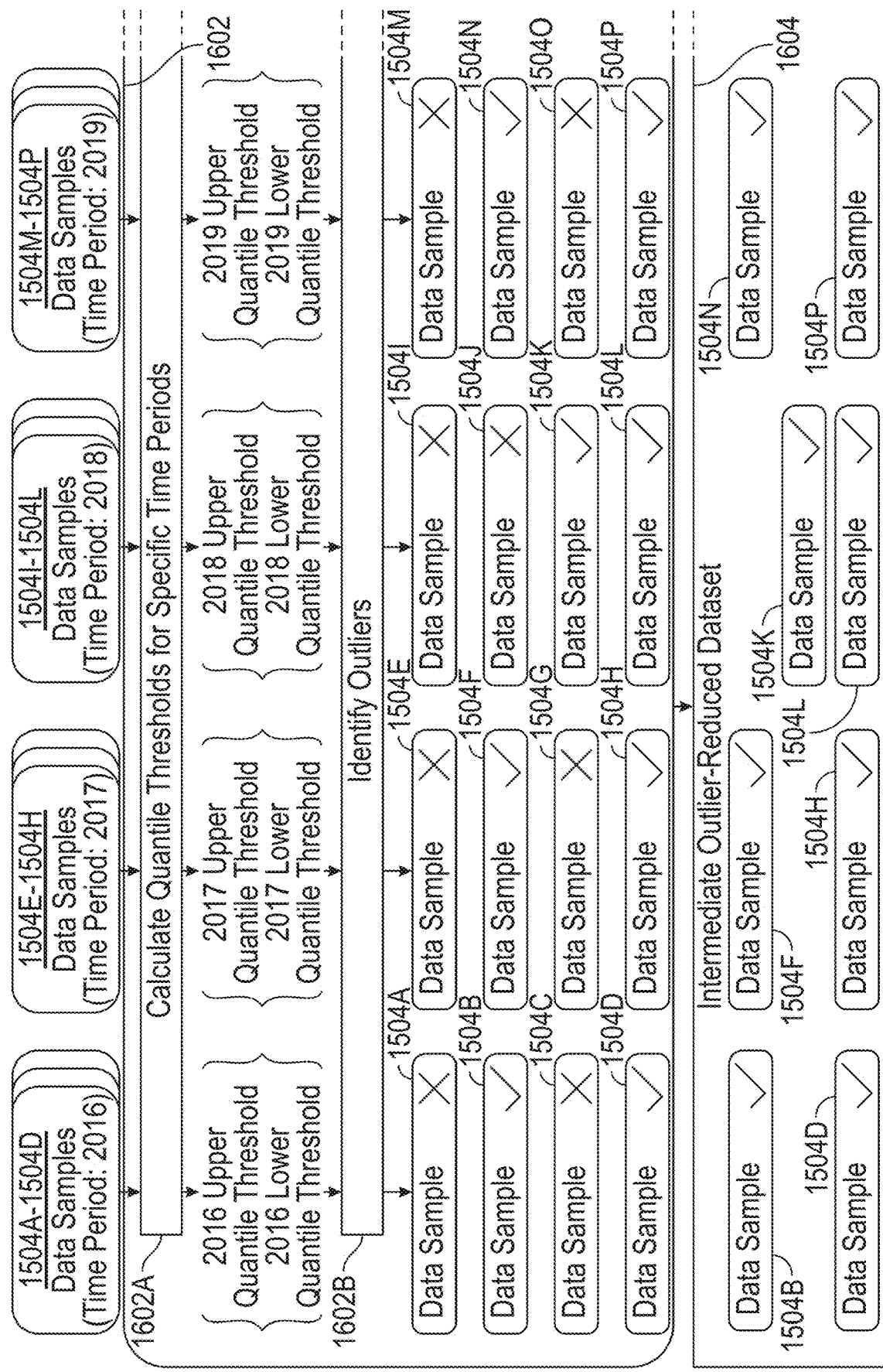
Figures 2, 16B:
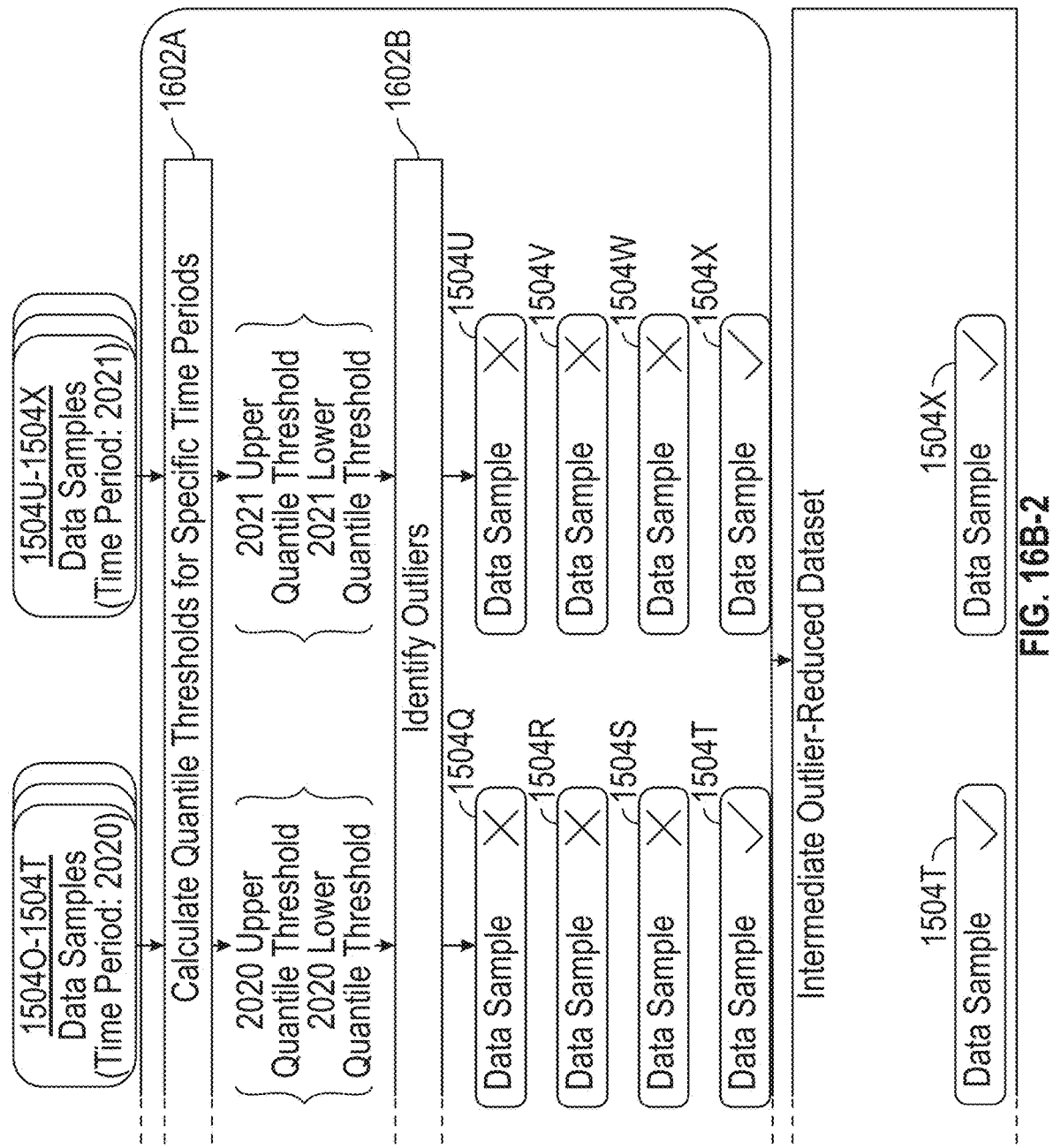

FIGS. 16B1-16B2 provide a visual elaboration on the process of identifying and handling data samples across various time periods with specific quantile thresholds incorporated. This process is intricately related to the foundational concepts depicted and discussed in FIG. 14 (e.g., subprocesses 1420A and 1420B), specifically concerning the process of outlier filtration and intermediate dataset creation. FIGS. 16B1-B2 illustrate one embodiment of the method for quantile threshold preprocessing and outlier detection for training datasets. It shall be appreciated that other embodiments are possible, highlighting the flexibility and adaptability of the invention across varying data contexts.

In FIG. 16B-1 and FIG. 16B-2, a sequential workflow is illustrated where data samples from consecutive years, specifically from 2016 to 2021 in this instance, undergo quantile threshold analysis for their respective time periods. In data-driven decision-making systems, method 1400 may be used to ensure the integrity and accuracy of the datasets used, which enables reliable model training and subsequent predictive analytics. This process begins with the initial data samples, labeled as Data Samples 1504A-1504D for the year 2016, Data Samples 1504E-1504H for the year 2017, Data Samples 15041-1504L for the year 2018, Data Samples 1504M-1504P for the year 2019, Data Samples 1504Q-1504T for the year 2020, and Data Samples 1504U-1504X for the year 2021. Each set of data samples corresponds to a specific time period, thus allowing for temporal-specific analysis and comparison.

Calculate Quantile Thresholds for Specific Time Periods 1602A is a process that involves calculating the quantile thresholds, specifically the upper and lower quantile thresholds for each year. Process Calculate Quantile Thresholds for Specific Time Periods 1602A may calculate specific quantile thresholds for various time periods, ensuring that each dataset is evaluated under criteria tailored to its unique or corresponding temporal context. The term "quantile thresholds" refers to statistical values that segment data into intervals based on their distribution, allowing for effective outlier identification. Following the setup/computation of thresholds, the data samples are then processed to identify outliers.

Referring to FIGS. 16B-1 and 16B-2, in some embodiments, Quantile-based Outlier Filtration Algorithm 1602B may include Identify Outliers 1602B. Process Identify Outliers 1602B may identify outliers by comparing each data sample against the calculated quantile thresholds. This process helps in distinguishing the data points that deviate significantly from the typical range, tagged as outliers, which are then excluded from the intermediate dataset to enhance the quality of data used for further analysis and model training.

In some aspects, these thresholds are fundamental in defining the boundaries for outlier identification in the subsequent step Identify Outliers 1602B. The calculated thresholds for each year may be crucial as they adapt the outlier detection mechanism to the peculiarity of each year's data distribution, accounting for possible shifts in trends or anomalies specific to each temporal segment. In some aspects, method 1400 dynamically adjusts quantile thresholds based on temporal data characteristics, enhancing the robustness of outlier detection.

Following the setup of thresholds, the data samples are then processed to identify outliers. In step Identify Outliers 1602B, each data sample is examined against the predetermined thresholds. Samples that do not conform to the established range (within the quantile thresholds) are marked with an "X", indicating their status as outliers. Conversely, samples that fall within the acceptable range are marked with a "V" checkmark, denoting them as valid samples for further processing.

The culmination of this rigorous filtration process results in the formation of an Intermediate Outlier-Reduced Dataset 1604, which includes only the validated data samples from each year (e.g., the data samples marked with "V"). In some aspects, this dataset is crucial as it represents a refined selection of data, free from identified outliers, thus enhancing the integrity and reliability of any subsequent analysis or model training.

Each yearly data segment demonstrates a clear progression from raw, unfiltered data samples through a defined threshold calculation step to meticulous outlier identification and selection, leading to the consolidation of an outlier-reduced dataset. This systematic approach ensures that data handling is both consistent and adaptable to specific time-related variations, providing a robust framework for handling datasets with temporal diversity.

The relationships and connections between the components in FIGS. 16B-1 and 16B-2 are essential in illustrating a comprehensive system that integrates time-sensitive data handling with precise outlier management to create a dependable dataset for advanced analytical processes. Each step, from the initial data acquisition through to the creation of an outlier-reduced dataset, is interconnected, showcasing a seamless flow that leverages quantile-based assessment for enhancing data quality and relevance.

In conclusion, FIGS. 16B-1 and 16B-2 not only support but also extend the methodologies introduced in FIG. 14 by incorporating a detailed, year-specific analysis framework that enhances the system's ability to manage and utilize large datasets effectively across different temporal contexts. This detailed portrayal ensures that the system remains adaptable and efficient in handling varying data characteristics over time, pivotal for applications requiring high precision and reliability in predictive modeling and analysis.

Figures 1, 16C:
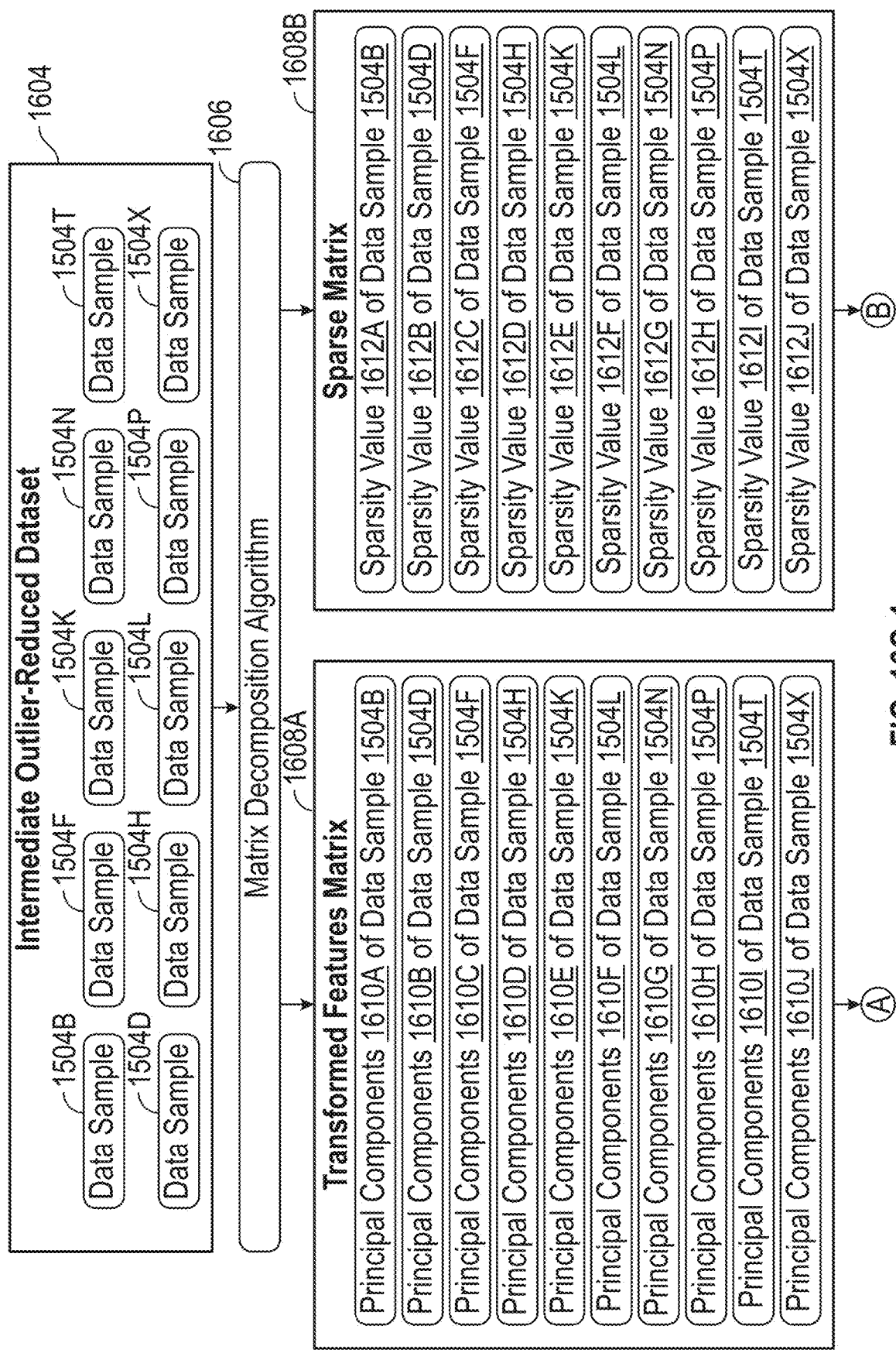
Figures 2, 16C:
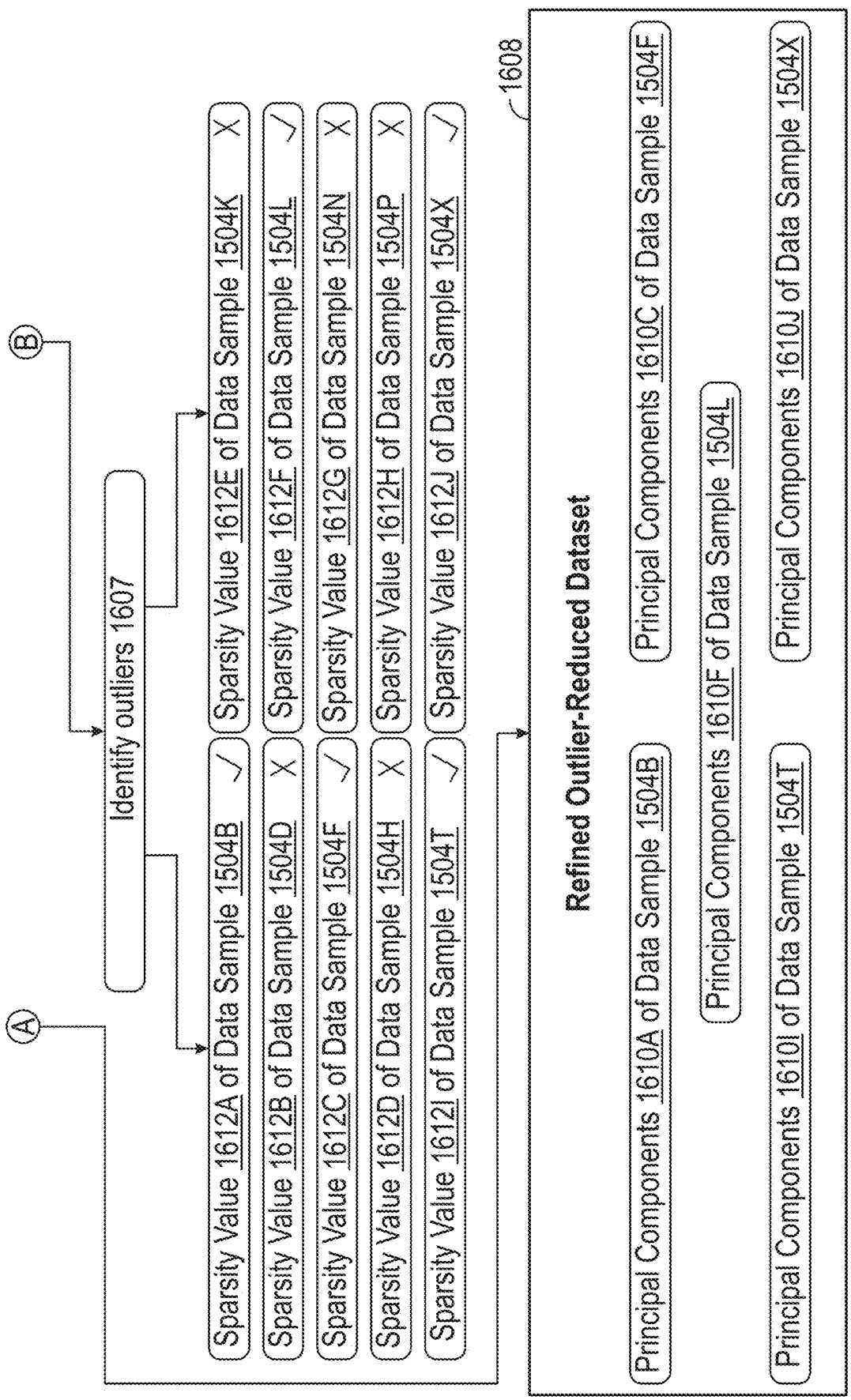

Referring to FIG. 16C, the diagram illustrates a comprehensive system for processing and refining training datasets utilizing robust principal component analysis (RPCA) combined with quantile threshold preprocessing for enhancing machine learning model accuracy. The process is delineated through interconnected steps, each contributing uniquely to the refinement of the dataset.

Initially, the Intermediate Outlier-Reduced Dataset 1604 is obtained, comprising various data samples initially from Raw Dataset 1500. Each data sample represents individual entries that store historical values of a target entity (e.g., energy commodity), which are crucial for the prediction tasks in machine learning models. These samples have undergone initial preprocessing to exclude any data points that significantly deviate from the defined quantile thresholds, thus termed "outlier-reduced" as described in FIGS. 16A and 16B.

Subsequently, the data samples 1504B-1504X in Intermediate Outlier-Reduced Dataset 1604 are fed (e.g., inputted) into Matrix Decomposition Algorithm 1606. Matrix Decomposition Algorithm 1606 divides Intermediate Outlier-Reduced Dataset 1604 into two key components: the Transformed Features Matrix 1608A and the Sparse Matrix 1608B. The Transformed Features Matrix 1608A consists of a set of principal components, such as Principal Components 1610A-1610J of Data Samples 1504B-1504X, which encapsulate the most significant informational aspects of the original data samples (e.g., the values associated with features or columns of the data samples) while reducing the overall dimensionality. This matrix decomposition focuses on retaining the variance critical to the underlying patterns in the dataset, utilizing robust statistical techniques inherent to Principal Component Analysis (PCA). It shall be noted that, in some portions of the disclosure, Principal Components 1610A-1610J may be referred to as including a plurality of feature vectors, wherein each feature vector represents a distinct principal component from a plurality of principal components. The plurality of feature vectors captures the underlying dimensions or characteristics of the dataset, with each feature vector corresponding to one of the principal components 1610A-1610J.

Concurrently, the Sparse Matrix 1608B records the sparsity values, such as Sparsity Values 1612A-1612J (e.g., numerical entries) of Data Samples 1504B-1504X, which represent deviations or anomalies from the principal components identified. These sparsity values are fundamental in identifying data points that significantly differ from the established norms, which could represent errors, outliers, or novel insights separate from the main data trends.

A critical operation following the decomposition is the identification of outliers in process Identify Outliers 1607, where sparsity values are scrutinized to determine if they exceed predetermined thresholds indicative of anomalous data points or samples. This step ensures that the refined dataset does not include misleading or erroneous information that could adversely affect the subsequent data processing or analytical outcomes.

This methodology effectively leverages the capabilities of Robust Principal Component Analysis (RPCA) by separating the main structure of the data (low-rank approximation) and the anomalies (sparse errors), which is essential for handling real-world datasets often contaminated with noise and outliers. In some aspects, RPCA is particularly adept at handling these complexities due to its optimization approach, which balances the minimization of the nuclear norm (promoting low rank) and the Li norm (promoting sparsity), thus allowing for a robust decomposition under various data conditions. In some aspects, the objective of this optimization is achieved by solving a formula designed to minimize a nuclear norm $\|L\|*$ of the transformed features matrix LL and an l1 norm $\|S\|1$ of the sparse matrix SS, formulated as minimize $|L|*+\lambda|S|1$. In this formula, $\lambda$ is a regularization parameter that is computed as $$\frac{1}{\sqrt{n}},$$

and n is a number of observations in the intermediate outlier-reduced dataset

In practice, this matrix decomposition provides a systematic way to enhance data integrity, simplify complex data structures, and uncover hidden patterns within large datasets, thereby supporting more accurate and reliable decision-making and predictive maintenance processes for energy utilities.

In a non-limiting example, the RPCA algorithm may be configured to detect unusual observations (e.g., anomalies) in the daily prices (e.g., demand) feature, represented by the day-of-year (DOY) column. In such embodiments, the DOY feature may be selected as the x-variable, while electricity prices (e.g., electricity demand) is selected as the y-variable.

The process then advances to step Identify Outliers 1607, where outliers are identified based on the Sparsity Values in Sparse Matrix 1608B. This step ensures that any residual anomalies, not filtered out in the initial preprocessing, are recognized and managed accordingly, enhancing the dataset's quality. Further values from the Sparse Matrix 1608B which are deemed outliers in this step are shown marked with an "X".

Following the identification and management of outliers, the Refined Outlier-Reduced Dataset 1608 is generated. This dataset is a purified form of Intermediate Outlier-Reduced Dataset 1604, where only the data devoid of significant anomalies (as indicated in the Identify Outliers 1607 are retained). In other words, the refined outlier reduce dataset 1608 includes the principal components of data samples that were not found to be anomalous (e.g., the sparsity value of the corresponding data sample is not anomalous).

Each step in FIG. 16C is intricately sequenced to create a robust methodology for preparing a dataset that is not only free from significant outliers but also refined to include only the most pertinent features through advanced mathematical techniques. This detailed preparatory work is foundational in training highly accurate and reliable predictive models, particularly useful in fields requiring precision such as the energy sector.

The depicted system and method provide clear, technical embodiments of processing training datasets through a combination of outlier management and feature refinement techniques. FIG. 16C provides important insights into handling large datasets, ensuring quality and reliability in predictive modeling tasks for diverse applications.

Figure 17A:
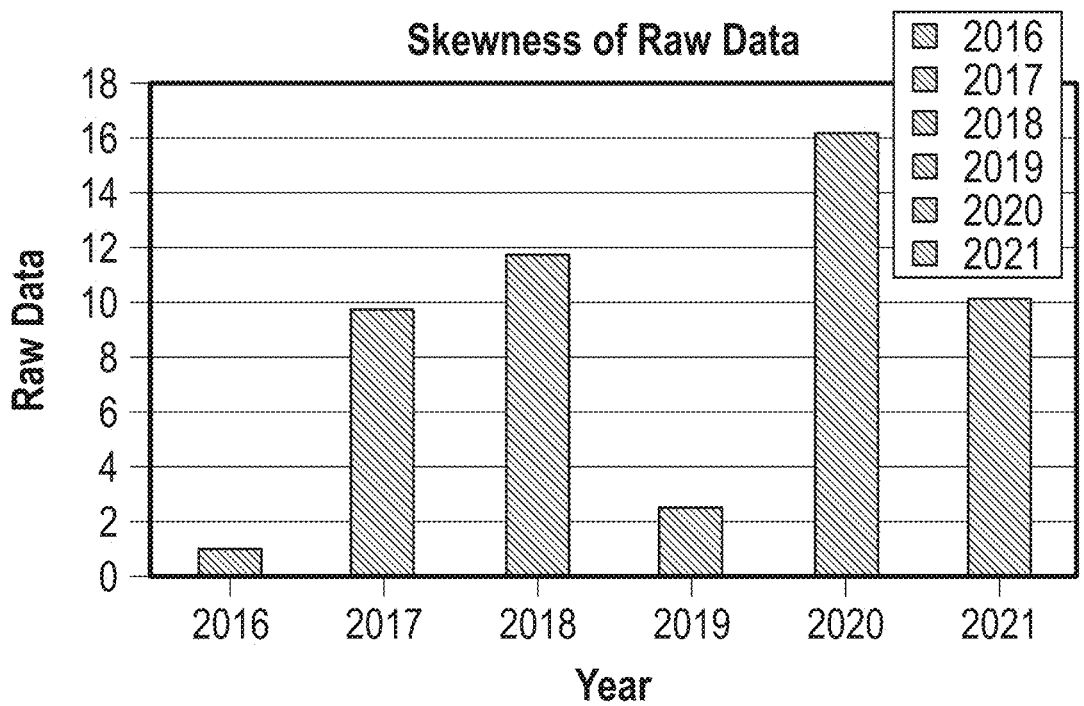
FIG. 17A illustrates example skewness levels in a raw dataset, according to some embodiments of the present technology.
Figure 17B:
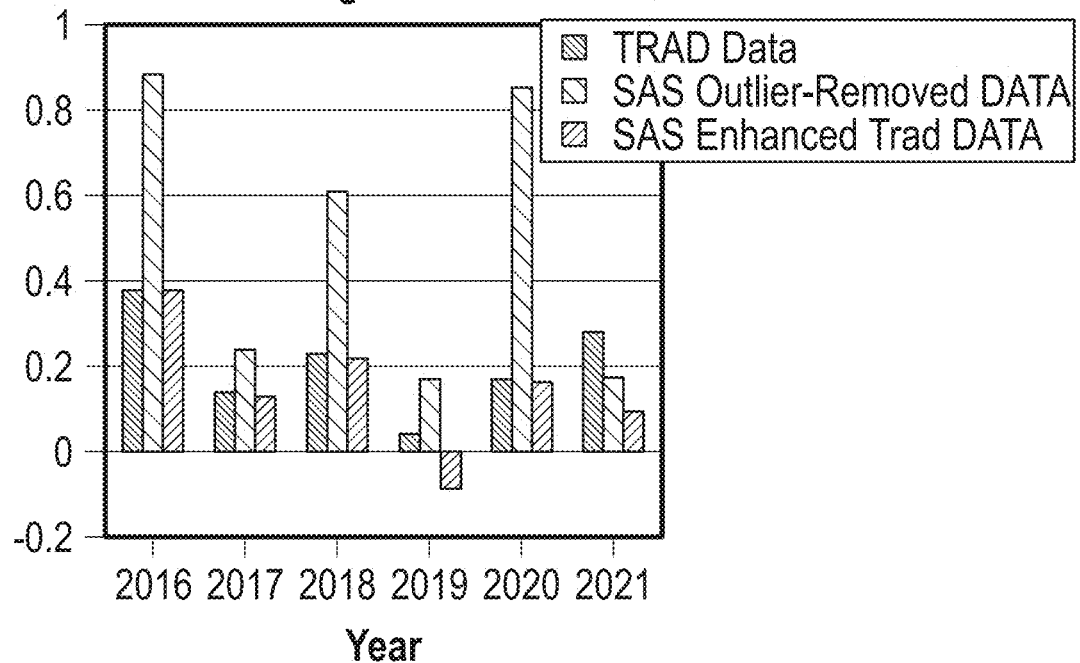
FIG. 17B illustrates example skewness levels in a raw dataset after executing one or more outlier removal methods, according to some embodiments of the present technology.

Referring next to FIG. 17A and FIG. 17B, these figures illustrate comparative visual analyses of the skewness levels in raw data and data post-outlier removal using various methodologies over the years 2016 to 2021. In a detailed exploration, these figures support the systems and methods for combining Robust Principal Component Analysis (RPCA) and quantile threshold preprocessing for improving the reliability of training datasets.

FIG. 17A displays the skewness of raw data annually from 2016 through 2021 along the y-axis, with skewness values ranging from 0 to 18 (e.g., the skewness present in data samples of raw dataset 1500). Each year's bar graph represents the asymmetry in the distribution of data samples and the extent to which these samples deviate from a normal distribution-a crucial factor affecting data analysis and subsequent model training. For instance, in 2020, a skewness value near 16 highlights significant deviation, indicating the presence of outliers that could potentially skew predictive modeling processes.

Transitioning to FIG. 17B, this figure delineates the effectiveness of different outlier removal methods, represented by varied bar patterns for each methodology: traditional data ("TRAD DATA" (e.g., raw data)), SAS Outlier-Removed Data, and SAS Enhanced Trad Data. Each method's impact on reducing data skewness is mapped across the same timeframe, with skewness values notably lower than those in FIG. 17A, showing improvements from nearly zero up to a maximum of 1. This stark reduction evidences the effectiveness of the preprocessing techniques in normalizing data distributions. Further, the SAS Enhanced Trad Data shows that applying the processing described in FIGS. 14 and FIGS. 16A-C have reduced skewness considerably in comparison to "TRAD Data" and "SAS Outlier-Removed Data" methods.

In some aspects, the implementation of these outlier removal processes is aligned with the detailed operational steps described elsewhere, including in FIGS. 14 and FIGS. 16A-C. The initial raw dataset, as depicted by the skewness in FIG. 17A, may undergo a quantile-based outlier filtration algorithm as described with respect to method 1400. This algorithm is instrumental in detecting and separating outlier data samples that exceed predetermined lower and upper quantile thresholds. The algorithm's effectiveness is visually corroborated in FIG. 17B where the reduction in skewness signifies the successful removal of outliers and a normalization of the dataset (e.g., SAS Outlier-Remoted DATA)

In other aspects, once outliers are filtered out as with the SAS Outlier-Removed Data, the dataset undergoes a decomposition process using an RPCA. This process, as outlined in FIGS. 16A-C, involves transforming the intermediate dataset into two matrices-a transformed features matrix and a sparse matrix. The former contains feature vectors of principal components, and the latter helps in identifying and excluding principal components of data samples related to anomalous values. FIG. 17B, by showcasing reduced skewness post-method application, indirectly validates the improvement in dataset quality, which can be pivotal for effective model training as shown in upcoming FIGS. 18A-D (e.g., SAS Enhanced Trad Data shows a greater reduction in skewness and heteroskedasticity in all calendars years than the other methods, especially calendar year 2021 in this non-limiting example).

In several aspects, the refined outlier-reduced dataset, now devoid of extreme skewness and heteroskedasticity, offers a more robust foundation for training predictive models. Mitigation of the impacts of heteroskedasticity and skewness, including their impacts on weights and biases of the models, is practically demonstrated as the adjusted datasets contribute to a balanced model that is less biased and more accurate in forecasting. In many aspects, the practical application of this innovation extends to various sectors where precise data modeling is crucial. For instance, in energy commodity predictions, where time series data of demand values are critical, the enhanced prediction accuracy resulting from refined datasets can significantly impact decision-making processes. The processes of data collection, outlier detection and removal, dataset decomposition, and final utilization in predictive modeling are all corroborated by the graphical reductions in skewness from FIG. 17A to FIG. 17B.

In conclusion, FIGS. 17A and 17B not only visually represent the data skewness for various years but also underscore the efficacy of the described outlier filtration and data processing methods. These figures provide a clear, quantifiable testament to the technological advancements claimed, showcasing the transition from raw, skewed data to refined, model-ready datasets. This transformation is pivotal for enhancing the accuracy and reliability of predictive models, thereby supporting the overarching claims of the patent application concerning systems and methods for data preprocessing in training datasets.

Figure 18A:
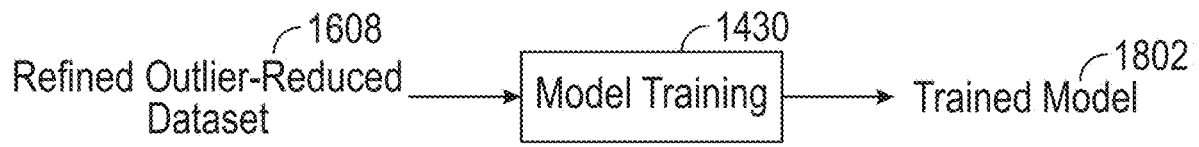
FIG. 18A illustrates a process for training a model using a refined outlier-reduced dataset, according to some embodiments of the present technology.

Referring to FIG. 18A, which illustrates a process for training a model using a Refined Outlier-Reduced Dataset 1608, the figure exemplifies a method for improving the predictive performance of machine learning models by utilizing preprocessed datasets that have undergone outlier filtering and matrix decomposition. The innovation presented by the system is designed to ensure that models are trained on high-quality data, which is crucial for accurate predictions in various applications, including energy demand forecasting.

In some aspects, the Refined Outlier-Reduced Dataset 1608 serves as the input for the model training process. This dataset, which excludes anomalies and outliers from the original raw dataset, may critically enhance the robustness and accuracy of the trained model. In other aspects, the Refined Outlier-Reduced Dataset 1608 may be derived through a sequence of preprocessing steps. Initially, a raw dataset is obtained, and an outlier filtration process is executed using a quantile-based outlier filtration algorithm. This algorithm detects outliers that exceed a lower quantile threshold or an upper quantile threshold. The resulting intermediate outlier-reduced dataset excludes these outliers and is further processed using a matrix decomposition algorithm like robust principal component analysis (RPCA).

The RPCA algorithm decomposes the intermediate dataset into a transformed features matrix and a sparse matrix. The transformed features matrix includes feature vectors of principal components, while the sparse matrix identifies anomalous values. The refined outlier-reduced dataset is then generated by excluding feature vectors (e.g., principal components) associated with anomalies in the sparse matrix. This refined dataset serves as a high-quality input for training the machine learning model. The Refined Outlier-Reduced Dataset 1608 is transferred to the Model Training Module 1430, an essential component responsible for developing the predictive model.

In various aspects, the Model Training Module 1430 may utilize a range of machine learning algorithms to train the model, including linear regression, decision trees, support vector machines, and neural networks. The choice of algorithm may depend on the nature of the data and the specific requirements of the prediction task. This module incorporates various methodologies, including supervised learning techniques, to optimize the model's parameters based on the refined dataset. The output of this training process is a Trained Model 1802, which is capable of making accurate predictions based on historical data. Trained Model 1802, once developed, can be deployed in various applications to provide real-time predictions and support decision-making processes.

Figure 18B:
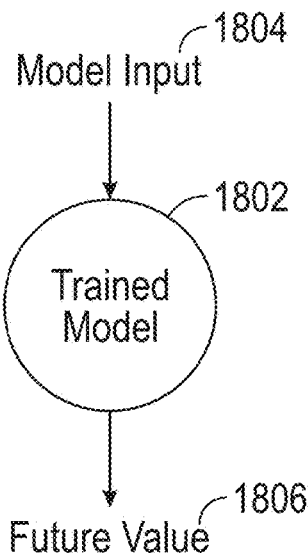
FIG. 18B illustrates an example schematic for predicting a future value with a trained machine learning model, according to some embodiments of the present technology.

Referring to FIG. 18B, the process focuses on the use of the trained model for predicting future values. The Trained Model 1802 receives Model Input 1804, which consists of features derived from the refined outlier-reduced dataset. This input serves as the basis for the model to generate a Future Value Prediction 1806 of the target entity (e.g., a demand of a (e.g., energy) commodity at the future time). The Trained Model 1802, leveraging its training on high-integrity data, ensures that the predictions are both accurate and reliable.

In certain aspects, the Trained Model 1802 may be used to predict the value of various target entities at future times, such as energy demand, stock prices, or sales forecasts. The Model Input 1804 may include features such as historical demand, temperature, day of the week, and other relevant factors. By incorporating both historical and temporal features, the model can generate highly accurate predictions for the specified future timeframe.

Figure 18C:
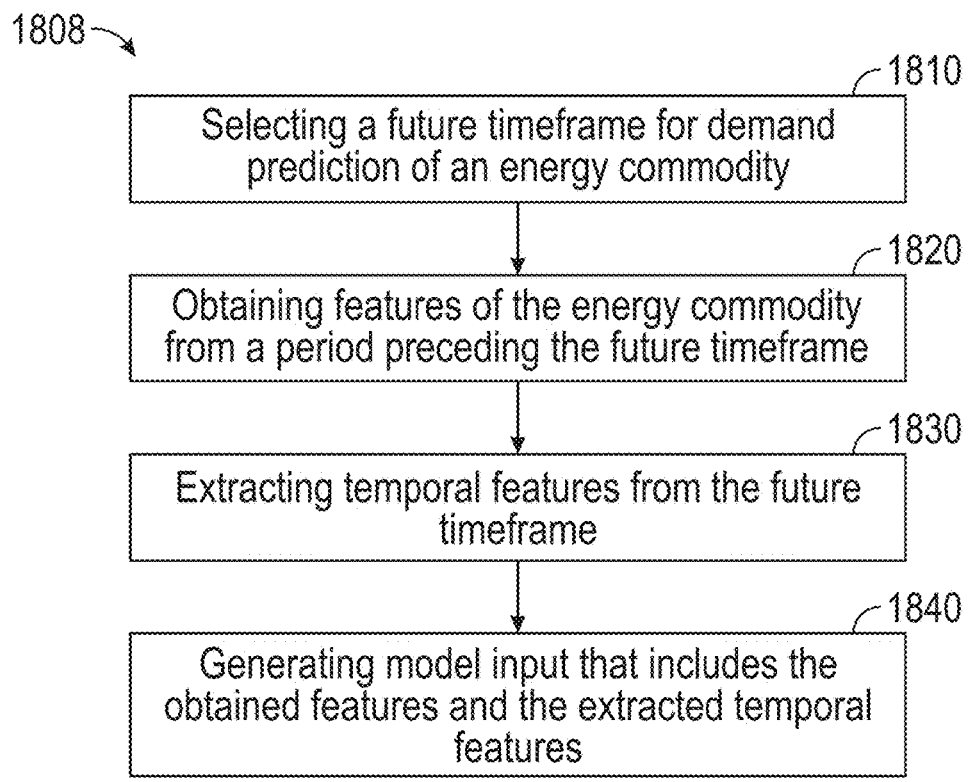
FIG. 18C illustrates an example process for generating an input to a machine learning model, according to some embodiments of the present technology.

Referring to FIG. 18C, in some embodiments, Method 1808 may include process 1810. Process 1810 may involve selecting a future timeframe for demand prediction of an energy commodity. This may include steps involved in generating the model input and using it to predict future demand for an energy commodity. The process begins with selecting a future timeframe for the prediction (e.g., 1, 6, 12, 24, 48, etc. hours ahead of a current timeframe). This step involves determining the specific period for which the energy demand forecast is required.

In certain aspects, the next step is process 1820, obtaining features of the energy commodity from a period preceding the future timeframe (e.g., the current time or any other time preceding or occurring before the future time). Process 1820 involves gathering relevant historical data that will inform the prediction. These features may include various metrics such as past energy consumption, temperature records, market dynamics data, yesterday's price per hour, load demand per hour, yesterday's average hourly load demand, numeric month of year, numeric day of year, the year, electricity supply availability data, and other relevant indicators (e.g., analogous features to raw dataset 1500, but for the future time period of interest). This historical data provides the context needed for accurate forecasting.

In various aspects, Method 1808 continues to Process 1830 with extracting temporal features (e.g., features described with respect to raw dataset 1500) from the future timeframe. Process 1830 ensures that the model input includes not only historical features but also temporal characteristics such as seasonal patterns, holidays, and other time-related factors that may influence energy demand.

In several aspects, the final Method 1808 subprocess is Process 1840 that includes generating model input that includes the obtained features and the extracted temporal features. Process 1840 combines all the relevant data into a cohesive input for the trained model. This comprehensive input enables the model to make informed predictions about future energy demand.

The system described in these figures operates by first refining the dataset to remove outliers and anomalies, thereby enhancing the quality of the data used for training the model. The model training module then develops a predictive model based on this refined dataset. Finally, the trained model utilizes historical and temporal features to generate accurate predictions for future demand.

In addition to energy demand forecasting, the system described in FIGS. 18A-C can be applied to other domains such as finance, healthcare, and supply chain management. For example, in finance, the system could be used to predict prices or market trends. In healthcare, it could be used to forecast patient admission rates or disease outbreaks. In supply chain management, it could be used to predict inventory needs or delivery times.

Overall, the system provides a robust and accurate method for preprocessing data, training predictive models, and generating future predictions. By combining RPCA and quantile threshold preprocessing, the system ensures that models are trained on high-quality data, leading to more reliable and accurate predictions. The components and processes involved in FIGS. 18A, 18B, and 18C provide a comprehensive understanding of how the system operates and can be utilized in various applications.

Referring to FIG. 18D-1 and FIG. 18D-2, a table illustrates the final model validation and performance metrics for an energy price forecasting system employing combined RPCA and quantile threshold preprocessing methods. The figure exemplifies significant improvements in forecast accuracy resulting from the disclosed preprocessing techniques. This system is designed to enhance the reliability of energy price predictions by mitigating the effects of outliers and heteroskedastic noise.

In some aspects, the FIGS. 18D-1 and 18D-2 highlight the performance metrics across different models and preprocessing strategies. An analysis in Results Table 1850 is divided into several rows across FIGS. 18D-1-2, each representing a distinct combination of preprocessing methods and their impact on forecast accuracy. Process 1852 and Process 1854 are of particular importance due to their demonstrated improvements.

Referring to Process 1852 as described in row 10 of Results Table 1850, in various aspects, Process 1852 illustrates the results of using a sparse matrix strategy within the robust principal component analysis (RPCA) framework to remove outliers. In Process 1852, sparse matrix strategy for outlier removal, shows how the combination of an advanced sparse matrix strategy within the RPCA action set and traditional methods for outlier removal significantly reduces forecast error. The results indicate that this combination effectively addresses heteroskedastic noise and improves overall forecasting accuracy.

Specifically, Row 10 contains Process 1852, in which a Linear Regression (LR) model is used for inference using 7 raw features, after outlier removal by traditional then SAS Sparse Matrix methods, as detailed elsewhere herein. After this outlier removal, Process 1852 demonstrates a lower variance in prediction errors when compared to other methods in Results Table 1850, highlighting the efficacy of the combined preprocessing approach. This reduction in variance is a critical factor in enhancing the model's robustness and reliability. By iteratively applying both RPCA and quantile threshold methods, the system achieves a refined dataset that leads to more accurate forecasts.

In certain aspects, the advanced sparse matrix strategy is implemented by first obtaining a raw dataset and then executing an outlier filtration process. This process includes detecting outlier data samples using a quantile-based outlier filtration algorithm and generating an intermediate outlier-reduced dataset. The intermediate dataset is then decomposed by an RPCA algorithm into a transformed features matrix and a sparse matrix. The final refined dataset excludes feature vectors associated with anomalous values in the sparse matrix, ensuring high-quality data for model training.

Referring to Process 1854 as described in row 12 of Results Table 1850, a method may leverage the successful inference of a trained Linear Regression model using SAS principal component analysis (PCA) transformed features after outlier removal by traditional then SAS Sparse Matrix methods to improve electricity price forecasting accuracy. Process 1854 showcases an advanced analytics method for electricity price forecasting demonstrates how PCA, when used in the presence of heteroskedastic noise, significantly enhances the model's predictive performance.

In several aspects, the use of PCA involves transforming the original features into principal components that capture the most significant variations in the dataset. This transformation reduces the dimensionality of the data, making it easier to detect and mitigate the effects of heteroskedastic noise. By focusing on the key features that drive price variations, the PCA approach improves the model's ability to forecast future prices accurately.

Process also highlights the successful development of multiple linear regression models for energy price forecasting using the transformed features obtained through PCA. The transformed features provide a more robust representation of the underlying data, leading to improved forecasting accuracy compared to models using raw features alone or with standard PCA techniques such as Python PCA.

In other aspects, the system depicted in FIG. 18D showcases the importance of selecting the appropriate preprocessing sequence to achieve optimal forecasting performance. The iterative application of both RPCA and quantile threshold methods, as shown in Process 1852, demonstrates the novelty and effectiveness of this combined approach. Additionally, the successful implementation of PCA techniques in Process 1854 highlights the potential for further improvements through dimensionality reduction and feature transformation.

The figure also emphasizes how overprocessing or underprocessing the data can lead to suboptimal results, as depicted in other rows. By identifying and applying the ideal sequence of preprocessing steps, the system ensures that the refined dataset is of the highest quality, leading to more accurate and reliable forecasts.

The combination of RPCA and quantile threshold preprocessing, along with the application of PCA techniques, represents a significant advancement in the field of predictive modeling. These methods collectively enhance the model's robustness, reduce forecast errors, and improve the overall accuracy of energy demand predictions.

In conclusion, the methods described in Results Table 1850 demonstrates the substantial benefits of combining advanced preprocessing techniques for outlier removal and feature transformation. By leveraging these techniques, the system provides a robust and accurate method for prediction, with potential applications in electricity grid management, energy demand, and various other domains requiring reliable forecasting models.

It shall be noted that the system and methods described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:

obtaining a raw dataset comprising a plurality of data samples that store historical values of a target entity that includes an energy commodity, healthcare data management, retail inventory, an energy market, an energy consumption, energy utilities, electricity grid management, or energy;

executing an outlier filtration process based on obtaining the raw dataset, wherein the outlier filtration process includes:

detecting, by a quantile-based outlier filtration algorithm, outlier data samples of the plurality of data samples that exceed a lower quantile threshold or an upper quantile threshold, generating an intermediate outlier-reduced dataset that includes a subset of the plurality of data samples, wherein the intermediate outlier-reduced dataset excludes the outlier data samples that exceed the lower quantile threshold or the upper quantile threshold, decomposing, by a matrix decomposition algorithm, the intermediate outlier-reduced dataset into a transformed features matrix and a sparse matrix, wherein the transformed features matrix includes a plurality of feature vectors of a plurality of principal components of the intermediate outlier-reduced dataset; and generating a refined outlier-reduced dataset that includes a subset of the plurality of feature vectors, wherein the refined outlier-reduced dataset excludes feature vectors of the transformed features matrix that are associated with an anomalous value in the sparse matrix;

training a model using the refined outlier-reduced dataset;

maintaining risk mitigation preparedness by predicting via the trained model a value of the target entity that includes predicting for a future time a demand of the energy commodity, the healthcare data management, the retail inventory, the energy market, the energy consumption, the energy utilities, the electricity grid management, or the energy; and predicting, via the trained model, the value of the target entity at the future time.

2. The computer-program product according to claim 1, wherein:
the sparse matrix includes a plurality of numerical entries,
a respective feature vector of the transformed features matrix is associated with a respective numerical entry in the sparse matrix,
a value of the respective numerical entry is anomalous when the value of the respective numerical entry corresponds to a non-zero value, and
the value of the respective numerical entry is not anomalous when the value of the respective numerical entry corresponds to a zero value.

3. The computer-program product according to claim 1, wherein:
a subset of the plurality of data samples in the raw dataset cause heteroskedasticity and skewness,
the refined outlier-reduced dataset excludes the subset of the plurality of data samples that cause the heteroskedasticity and the skewness, and
using the refined outlier-reduced dataset to train the model mitigates an impact that the heteroskedasticity and the skewness have on a weight and a bias of the model.

4. The computer-program product according to claim 1, wherein:
the quantile-based outlier filtration algorithm detects that a first subset of the plurality of data samples exceed the lower quantile threshold and that a second subset of the plurality of data samples exceed the upper quantile threshold, and
the intermediate outlier-reduced data set:
excludes the outlier data samples that exceed the lower quantile threshold and the upper quantile threshold, including the first subset and the second subset of the plurality of data samples, and
includes data samples of the plurality of data samples that are within the lower quantile threshold and the upper quantile threshold.

5. The computer-program product according to claim 1, wherein:
the lower quantile threshold and the upper quantile threshold are computed for a first period of time within the raw dataset,
the quantile-based outlier filtration algorithm further computes a lower quantile threshold and an upper quantile threshold for at least a second period of time within the raw dataset, and
detecting, by the quantile-based outlier filtration algorithm, includes:
detecting the outlier data samples of the plurality of data samples that exceed the lower quantile threshold and the upper quantile threshold of the first period of time, and
detecting outlier data samples of the plurality of data samples that exceed the lower quantile threshold and the upper quantile threshold of the second period of time.

6. The computer-program product according to claim 1, wherein:
the raw dataset includes a first number of dimensions, and
the transformed features matrix represents features of the intermediate outlier-reduced dataset, a subset of the raw dataset, using a smaller number of dimensions than the first number of dimensions.

7. The computer-program product according to claim 1, wherein:
the outlier filtration process includes a plurality of outlier filtration stages, including a first outlier filtration stage and a second outlier filtration stage,
the first outlier filtration stage is executed before the second outlier filtration stage and includes:
the detecting of the outlier data samples that exceed the lower quantile threshold or the upper quantile threshold, and
the generating of the intermediate outlier-reduced dataset, and
the second outlier filtration stage is executed after the first outlier filtration stage and includes:
the decomposing of the intermediate outlier-reduced dataset, and
the generating of the refined outlier-reduced dataset.

8. The computer-program product according to claim 1, wherein:
the plurality of data samples stores the historical values of the target entity via a demand value column,
the lower quantile threshold is calculated as a first quartile of the demand value column minus a product between a pre-defined scaling factor and an interquartile range of the demand value column, and
the upper quantile threshold is calculated as a third quartile of the demand value column plus the product between the pre-defined scaling factor and the interquartile range of the demand value column.

9. The computer-program product according to claim 8, wherein the interquartile range of the demand value column is defined as a difference between the third quartile of the demand value column and the first quartile of the demand value column.

10. The computer-program product according to claim 1, wherein:
the plurality of data samples are time series data samples recorded at pre-defined intervals over a period of time, and
a historical value stored within a respective data sample of the plurality of data samples specifies a historical demand of the energy commodity at a respective interval over the period of time.

11. The computer-program product according to claim 1, wherein a respective data sample of the plurality of data samples includes:
a respective historical value of the target entity, and
a plurality of features for predicting the respective historical value.

12. The computer-program product according to claim 1, wherein predicting the value of the target entity at the future time includes:
receiving, via the trained model, a model input that at least specifies features of the target entity during a period preceding the future time; and
predicting, via the trained model, the value of the target entity at the future time based at least on the features of the target entity during the period preceding the future time.

13. The computer-program product according to claim 12, wherein:
the future time is 24 hours ahead of a current time, and
the period preceding the future time is the current time.

14. The computer-program product according to claim 12, wherein the features of the target entity during the period preceding the future time at least include:
the demand of the target entity during the period preceding the future time, and a load of the target entity during the period preceding the future time.

15. The computer-program product according to claim 14, wherein:
the features of the target entity during the period preceding the future time further include:
an average load of the target entity during a day associated with the period preceding the future time, and
the model input further specifies temporal features associated with the future time, including:
a numerical representation of a month associated with the future time,
a numerical representation of a day of week associated with the future time,
a numerical representation of a day of month associated with the future time, and
a numerical representation of a day of year associated with the future time.

16. The computer-program product according to claim 1, wherein:
the matrix decomposition algorithm is a robust principal component analysis algorithm (RPCA),
the robust principal component analysis algorithm (RPCA) solves an optimization formula to decompose the intermediate outlier-reduced dataset into the transformed features matrix and the sparse matrix, and
an objective of the optimization formula is to minimize a nuclear norm $\|L\|*$ of the transformed features matrix LL and an l1 norm $\|S\|1$ of the sparse matrix SS, formulated as minimize $|L|*+\lambda|S|1$, wherein: $\lambda$ is a regularization parameter that is computed as $$\frac{1}{\sqrt{n}},$$

and n is a number or observations in the intermediate outlier-reduced dataset.

17. A computer-implemented method comprising:
obtaining a raw dataset comprising a plurality of data samples that store historical values of a target entity that includes an energy commodity, healthcare data management, retail inventory, an energy market, an energy consumption, energy utilities, electricity grid management, or energy;
executing an outlier filtration process based on obtaining the raw dataset, wherein the outlier filtration process includes:
detecting, by a quantile-based outlier filtration algorithm, outlier data samples of the plurality of data samples that exceed a lower quantile threshold or an upper quantile threshold,
generating an intermediate outlier-reduced dataset that includes a subset of the plurality of data samples, wherein the intermediate outlier-reduced dataset excludes the outlier data samples that exceed the lower quantile threshold or the upper quantile threshold,
decomposing, by a matrix decomposition algorithm, the intermediate outlier-reduced dataset into a transformed features matrix and a sparse matrix, wherein the transformed features matrix includes a plurality of feature vectors of a plurality of principal components of the intermediate outlier-reduced dataset; and
generating a refined outlier-reduced dataset that includes a subset of the plurality of feature vectors, wherein the refined outlier-reduced dataset excludes feature vectors of the transformed features matrix that are associated with an anomalous value in the sparse matrix;
training a model using the refined outlier-reduced dataset;
maintaining risk mitigation preparedness by predicting via the trained model a value of the target entity that includes predicting for a future time a demand of the energy commodity, the healthcare data management, the retail inventory, the energy market, the energy consumption, the energy utilities, the electricity grid management, or the energy; and
predicting, via the trained model, the value of the target entity at the future time.

18. The computer-implemented method according to claim 17, wherein:
the sparse matrix includes a plurality of numerical entries,
a respective feature vector of the transformed features matrix is associated with a respective numerical entry in the sparse matrix,
a value of the respective numerical entry is anomalous when the value of the respective numerical entry corresponds to a non-zero value, and
the value of the respective numerical entry is not anomalous when the value of the respective numerical entry corresponds to a zero value.

19. The computer-implemented method according to claim 17, wherein:
a subset of the plurality of data samples in the raw dataset cause heteroskedasticity and skewness,
the refined outlier-reduced dataset excludes the subset of the plurality of data samples that cause the heteroskedasticity and the skewness, and
using the refined outlier-reduced dataset to train the model mitigates an impact that the heteroskedasticity and the skewness have on a weight and a bias of the model.

20. The computer-implemented method according to claim 17, wherein:
the quantile-based outlier filtration algorithm detects that a first subset of the plurality of data samples exceed the lower quantile threshold and that a second subset of the plurality of data samples exceed the upper quantile threshold, and
the intermediate outlier-reduced data set:
excludes the outlier data samples that exceed the lower quantile threshold and the upper quantile threshold, including the first subset and the second subset of the plurality of data samples, and
includes data samples of the plurality of data samples that are within the lower quantile threshold and the upper quantile threshold.

21. The computer-implemented method according to claim 17, wherein:
the lower quantile threshold and the upper quantile threshold are computed for a first period of time within the raw dataset,
the quantile-based outlier filtration algorithm further computes a lower quantile threshold and an upper quantile threshold for at least a second period of time within the raw dataset, and
detecting, by the quantile-based outlier filtration algorithm, includes:

detecting the outlier data samples of the plurality of data samples that exceed the lower quantile threshold and the upper quantile threshold of the first period of time, and detecting outlier data samples of the plurality of data samples that exceed the lower quantile threshold and the upper quantile threshold of the second period of time.

22. The computer-implemented method according to claim 17, wherein:
the raw dataset includes a first number of dimensions, and
the transformed features matrix represents features of the intermediate outlier-reduced dataset, a subset of the raw dataset, using a smaller number of dimensions than the first number of dimensions.

23. The computer-implemented method according to claim 17, wherein:
the outlier filtration process includes a plurality of outlier filtration stages, including a first outlier filtration stage and a second outlier filtration stage,
the first outlier filtration stage is executed before the second outlier filtration stage and includes:
the detecting of the outlier data samples that exceed the lower quantile threshold or the upper quantile threshold, and
the generating of the intermediate outlier-reduced dataset, and
the second outlier filtration stage is executed after the first outlier filtration stage and includes:
the decomposing of the intermediate outlier-reduced dataset, and
the generating of the refined outlier-reduced dataset.

24. A computer-implemented system comprising:
one or more processors;
a memory;
a non-transitory computer-readable medium operably coupled to the one or more processors, the non-transitory computer-readable medium having computer-readable instructions stored thereon that, when executed by the one or more processors, cause a computing device to perform operations comprising:
obtaining a raw dataset comprising a plurality of data samples that store historical values of a target entity that includes an energy commodity, healthcare data management, retail inventory, an energy market, an energy consumption, energy utilities, electricity grid management, or energy;
executing an outlier filtration process based on obtaining the raw dataset, wherein the outlier filtration process includes:
detecting, by a quantile-based outlier filtration algorithm, outlier data samples of the plurality of data samples that exceed a lower quantile threshold or an upper quantile threshold,
generating an intermediate outlier-reduced dataset that includes a subset of the plurality of data samples, wherein the intermediate outlier-reduced dataset excludes the outlier data samples that exceed the lower quantile threshold or the upper quantile threshold,
decomposing, by a matrix decomposition algorithm, the intermediate outlier-reduced dataset into a transformed features matrix and a sparse matrix, wherein the transformed features matrix includes a plurality of feature vectors of a plurality of principal components of the intermediate outlier-reduced dataset; and generating a refined outlier-reduced dataset that includes a subset of the plurality of feature vectors, wherein the refined outlier-reduced dataset excludes feature vectors of the transformed features matrix that are associated with an anomalous value in the sparse matrix;
training a model using the refined outlier-reduced dataset;
maintaining risk mitigation preparedness by predicting via the trained model a value of the target entity that includes predicting for a future time a demand of the energy commodity, the healthcare data management, the retail inventory, the energy market, the energy consumption, the energy utilities, the electricity grid management, or the energy; and
predicting, via the trained model, the value of the target entity at the future time.

25. The computer-implemented system according to claim 24, wherein:
the sparse matrix includes a plurality of numerical entries,
a respective feature vector of the transformed features matrix is associated with a respective numerical entry in the sparse matrix,
a value of the respective numerical entry is anomalous when the value of the respective numerical entry corresponds to a non-zero value, and
the value of the respective numerical entry is not anomalous when the value of the respective numerical entry corresponds to a zero value.

26. The computer-implemented system according to claim 24, wherein:
a subset of the plurality of data samples in the raw dataset cause heteroskedasticity and skewness,
the refined outlier-reduced dataset excludes the subset of the plurality of data samples that cause the heteroskedasticity and the skewness, and
using the refined outlier-reduced dataset to train the model mitigates an impact that the heteroskedasticity and the skewness have on a weight and a bias of the model.

27. The computer-implemented system according to claim 24, wherein:
the quantile-based outlier filtration algorithm detects that a first subset of the plurality of data samples exceed the lower quantile threshold and that a second subset of the plurality of data samples exceed the upper quantile threshold, and
the intermediate outlier-reduced data set:
excludes the outlier data samples that exceed the lower quantile threshold and the upper quantile threshold, including the first subset and the second subset of the plurality of data samples, and
includes data samples of the plurality of data samples that are within the lower quantile threshold and the upper quantile threshold.

28. The computer-implemented system according to claim 24, wherein:
the lower quantile threshold and the upper quantile threshold are computed for a first period of time within the raw dataset,
the quantile-based outlier filtration algorithm further computes a lower quantile threshold and an upper quantile threshold for at least a second period of time within the raw dataset, and
detecting, by the quantile-based outlier filtration algorithm, includes:

detecting the outlier data samples of the plurality of data samples that exceed the lower quantile threshold and the upper quantile threshold of the first period of time, and detecting outlier data samples of the plurality of data samples that exceed the lower quantile threshold and the upper quantile threshold of the second period of time.

29. The computer-implemented system according to claim 24, wherein:

the raw dataset includes a first number of dimensions, and the transformed features matrix represents features of the intermediate outlier-reduced dataset, a subset of the raw dataset, using a smaller number of dimensions than the first number of dimensions.

* * * * *